(12) United States Patent
Ledingham et al.

(10) Patent No.: US 7,203,596 B2
(45) Date of Patent: Apr. 10, 2007

(54) AIR TRAFFIC INFORMATION DISPLAY SYSTEM

(75) Inventors: Robert Ledingham, Manotick (CA); Keith Penny, Orleans (CA); Roman Zak, Edmonton (CA); Jaff Zanin, Burlington (CA); Howard Aikins, Monroe, WA (US)

(73) Assignee: NAV Canada (CA)

( * ) Notice: Subject to any disclaimer, the term of this patent is extended or adjusted under 35 U.S.C. 154(b) by 123 days.

(21) Appl. No.: 10/698,891

(22) Filed: Oct. 31, 2003
(Under 37 CFR 1.47)

(65) Prior Publication Data
US 2005/0080551 A1 Apr. 14, 2005

(30) Foreign Application Priority Data
Oct. 10, 2003 (CA) .................................... 2445220

(51) Int. Cl.
G06G 7/76 (2006.01)
G06F 19/00 (2006.01)
(52) U.S. Cl. .................. 701/120; 707/104.1; 705/6
(58) Field of Classification Search ........... 701/120; 707/104.1, 100; 705/6
See application file for complete search history.

(56) References Cited

U.S. PATENT DOCUMENTS

| | | | | |
|---|---|---|---|---|
| 6,032,158 A | * | 2/2000 | Mukhopadhyay et al. | 707/201 |
| 6,161,097 A | * | 12/2000 | Glass et al. | 705/6 |
| 6,199,008 B1 | * | 3/2001 | Aratow et al. | 701/120 |
| 6,278,965 B1 | * | 8/2001 | Glass et al. | 703/22 |
| 6,292,827 B1 | * | 9/2001 | Raz | 709/217 |
| 6,615,253 B1 | * | 9/2003 | Bowman-Amuah | 709/219 |
| 2002/0188610 A1 | * | 12/2002 | Spencer | 707/10 |
| 2003/0109973 A1 | * | 6/2003 | Hensey et al. | 701/35 |

OTHER PUBLICATIONS

Three Tier Software Architectures, Software Technology Roadman, at least as early as Jun. 6, 2002 (http://web.archive.org/web/20020606203041/http://www.sei.cmu.edu/str/descriptions/threetier_body.thml), Carnegie Mellon Software Engineering Institute (www.sei.cmu.edu/str/descriptions/threetier_body.html).*

* cited by examiner

Primary Examiner—Thomas Black
Assistant Examiner—Marie A Weiskopf
(74) Attorney, Agent, or Firm—Blakely, Sokoloff, Taylor & Zafman LLP

(57) ABSTRACT

An air traffic information display system includes a server having data manager. The data manager includes a first interface connected with a first database server and a plurality of second interfaces connected to a plurality of clients. The data manager includes a subscription list for the plurality of clients for providing the clients with data updates. The subscription list also includes criteria for each client. The data updates are distributed based upon the criteria of each client.

32 Claims, 21 Drawing Sheets

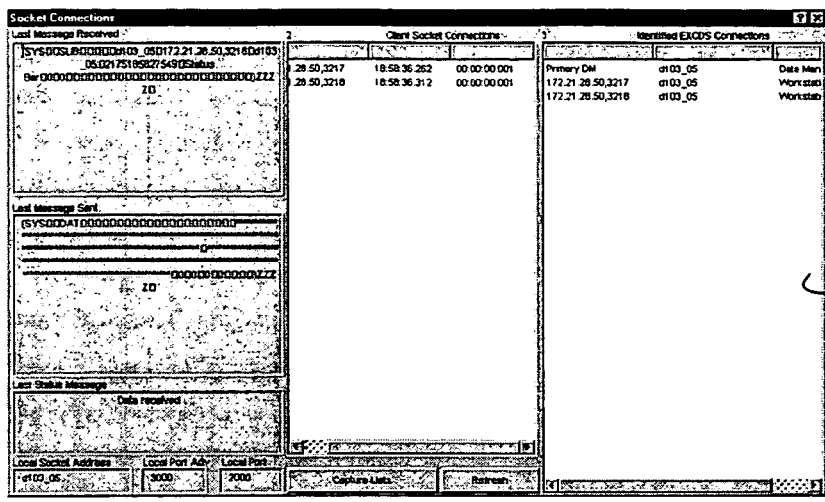

Fig. 8

| IpAddr:Port | Machine | Panel | App. Type | Sub. Type | Add | A |
|---|---|---|---|---|---|---|
| 172.21.25.21,1767 | workstation_2 | Client Connection List | IO.Server | Client Connection List | | |
| 172.21.25.21,1767 | workstation_2 | FDE List | IO Server | Fde | | |
| 172.21.25.21,1767 | workstation_2 | System Data List | IO Server | System Data | | |
| 172.21.25.21,1768 | workstation_2 | Client Connection List | Routine Manager | Client Connection List | | |
| 172.21.25.21,1768 | workstation_2 | FDE List | Routine Manager | Fde | | |
| 172.21.25.21,1768 | workstation_2 | System Data List | Routine Manager | System Data | | |
| 172.21.25.21,1778 | workstation_2 | Client Connection List | Workstation | Client Connection List | | |
| 172.21.25.21,1778 | workstation_2 | Planned Departures | Workstation | Fde | C | |
| 172.21.25.21,1778 | workstation_2 | Standby | Workstation | Fde | C | |
| 172.21.25.21,1778 | workstation_2 | Status Bar | Workstation | System Data | | |

Tower Position

Fig. 32
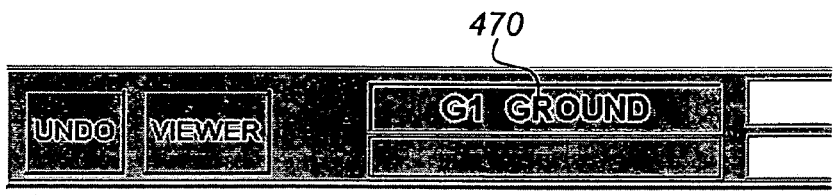
Fig. 33
| Red | not connected |
|---|---|
| Yellow | established socket connection |
| Blue | receipt of connection list |
| Green | receipt of complete subscription |
Fig. 34

AIR TRAFFIC INFORMATION DISPLAY SYSTEM

FIELD OF THE INVENTION

The present invention relates to air traffic information display systems, and is particularly concerned with interactive display systems.

BACKGROUND OF THE INVENTION

In order to maintain a safe and efficient working environment air traffic controllers must communicate directly with other air traffic controllers, pilots, assistants, and others that are responsible for areas and systems associated with their operating domain. This communication may be for different reasons and have many different priority levels and response protocols. All verbal communication directed at an air traffic controller whether via the communications system or by an adjacent controller is received with the same level of priority which, as traffic increases, leads to higher workload and stress. The air traffic controller cannot distinguish the priority of any single message until it has been received and decoded.

Traffic levels and airspace complexity that are within the scope of the controllers designed workspace take into account random reciept of verbal messages and normally would pose no additional problems. However, in recent years the amount of variability in traffic, coordination, and subsequently received verbal message traffic has increased dramatically. There are many factors such as meteorological conditions, economic conditions, etc that contribute to this apparent randomness The normal response to systemic conditions that abnormally overload an air traffic control sector is to immediately introduce procedures that limit the amount of aircraft that are being introduced into the system. This mitigation has unfortunate commercial consequences and is instigated when no other alternatives such as additional staffing are available. A technological solution to prioritize the verbal interruptions received by a controller was required.

An additional problem was that in many air traffic control facilities, flight data is produced and recorded on strips of paper. These are sometimes passed on to other controllers and form part of the permanent record of air traffic control decisions. The problem arises when only hard copy paper procedures are used in the coordination and communication of flight data since tactical changes and decisions must be fed to others who may interact with flights.

A requirement existed for a system to automate the cumbersome procedure of updating and communicating flight data. In order to effect such a change the system would have to meet several key and relatively unique requirements:

Firstly, because safety critical decisions are based upon the flight data information, all possible effort must be taken to ensure the system is designed so that data is transmitted intact securely, and with timely delivery.

Secondly, the system must be utilized to disseminate information across a large geographical area to a significant number of clients and therefore must make maximum use of technical innovations to meet this and the first requirement at the same time.

Finally, and most important the system must seamlessly integrate, to the maximum extent possible, into the air traffic controllers work environment such that the proven operational procedures that have been developed need not be significantly modified.

SUMMARY OF THE INVENTION

An object of the present invention is to provide an improved air traffic information display system.

The present invention solves some particular problems encountered in the field of air traffic control systems. For example, the present invention delivers information to the air traffic controller in an extremely reliable manner and allows the air traffic controller to absorb the information according to the air traffic controller's priorities.

In addition the present invention allows the sharing of information between different air traffic controllers so as to reduce the amount of verbal communication received by and transmitted by the air traffic controller.

The present invention also allows flight data to be recorded, displayed, shared and disseminated in a safe and efficient manner on computer displays and not strips of paper thus greatly improving the workflow of the individual and of the work place in general.

Further, the invention can mimic the "look and feel" of the paper strips thus minimizing the amount of change the air traffic controller must undergo to adopt usage of the invention.

In order to achieve these attributes, the invention must have an extremely flexible Computer Human Interface. This feature of the invention not only defines the visual aspect but also the work and data flow requirements of the particular air traffic controller workstation.

The uniqueness of the present invention is directly attributable to its emphasis on reliability, scalability and flexibility.

In accordance with an aspect of the present invention there is provided an air traffic information display system comprising: a data manager including a first interface and a plurality of second interfaces; a first database server connected to the data manager via the first interface; and a plurality of clients capable of coupling to the data manager via the plurality of second interfaces; the data manager including a subscription list for the plurality of clients for providing data updates in accordance thereto.

In accordance with an aspect of the present invention there is provided a method of displaying air traffic information comprising the steps of maintaining a list of subscribers for data updates, receiving a data update request, changing the data in accordance with the request, storing the changed data; and providing the changed data in accordance with the list of subscribers.

An advantage of the present invention is to provide a paperless air traffic control environment, in which hotlines are maintained as a backup only. This will provide many benefits including peer visibility of flight data and status, better automated workflow, automatic recording of worker and system actions.

BRIEF DESCRIPTION OF THE DRAWINGS

The present invention will be further understood from the following detailed description with reference to the drawings in which:

FIG. 8 illustrates in a client connection list of the data manager of FIGS. 3 and 4;

FIG. 9 illustrates in a subscription list of the data manager of FIGS. 3 and 4;

FIG. 32 illustrates that the name of the target DM of the EXCDS application is displayed on the top of the screen, along with the EXCDS version number;

FIG. 33 illustrates the EXCDS application connection sequence represented by four steps, which are displayed in the Status Bar Position Name area as a background colour;

FIG. 34 illustrates how the background colour of the Position Name is coded;

DETAILED DESCRIPTION OF THE PREFERRED EMBODIMENT

Figure 1:
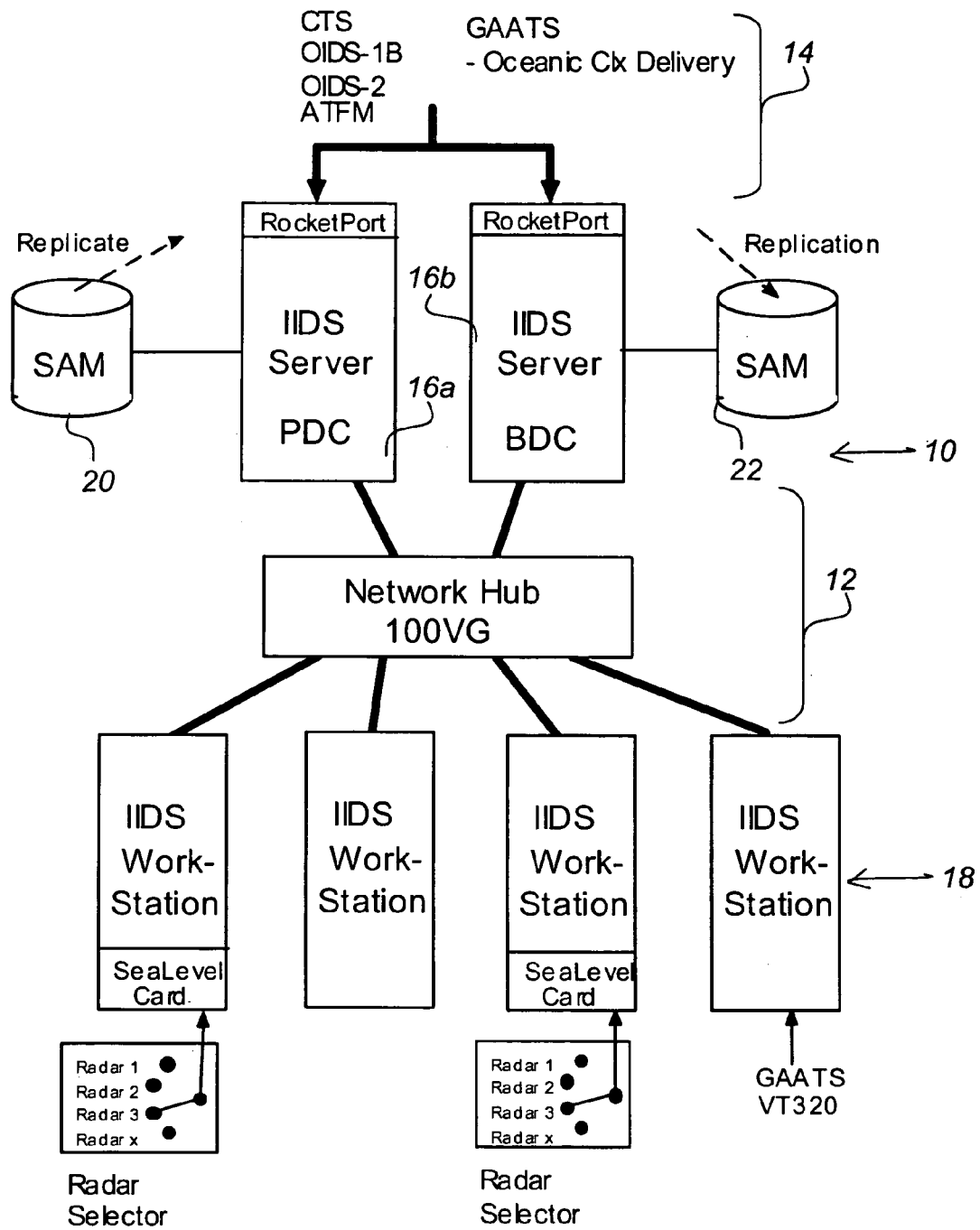
FIG. 1 illustrates in a block diagram an interactive information display system (IIDS) for an airport.

Referring to FIG. 1, there is illustrated in a block diagram an interactive information display system (IIDS) for monitoring traffic at an airport.

The IIDS Operational Network includes:
100VG LAN segments 12
10Base-T LAN segments 14
Servers 16
Workstations 18.

The 100VG LAN is 100 Mbit per second Ethernet and Token Ring networking technology. 100VG is based on the IEEE 802.12 standard for transmitting 802.3 Ethernet and 802.5 Token Ring frame data.

The 10Base-T standard is one of several adaptations of the Ethernet (IEEE 802.3) standard for LANs. 10Base-T (also called Twisted Pair Ethernet) uses a twisted-pair cable with maximum lengths of 100 metres. The cable is thinner and more flexible than the coaxial cable used for the 10Base02 or 10Base-5 standards. The 10Base-T system operates at 10 Mbps, and uses baseband transmission methods.

In the NT 4.0 environment, there are Primary Domain Controllers (PDC) 16a, Backup Domain Controllers (BDC) 16b and Member Servers. The PDC 16a maintains a single Security Accounts Manager (SAM) database 20 for all the users within the domain. Any computer in the domain with user-level access security enabled, and which participates in the domain, can request that the domain controller authenticate a user who is attempting to log on either locally or via the network. A domain has only one PDC.

BDCs 16b receive copies 22 of the PDC's SAM. These copies 22 are automatically synchronized periodically with the PDC's master. BDCs also authenticate user logons, and can be promoted to function as PDCs. Multiple BDCs can exist on a domain.

Member Servers do not receive copies of the SAM, and must submit all domain authentication requests to either a PDC or BDC. Member servers are dedicated servers in the traditional sense, and are used in IIDS and EXCDS to provide server-type services to the network.

All servers on the IIDS Operational Network are running NT 4.0 Server software. In addition to performing the LAN management tasks described above, the servers also share their resources on the LAN. The IIDS servers, for example, perform the PDC and BDC functions, as well as the IIDS-specific tasks such as receiving OIDS weather data, and making the data available.

Workstations are computers on the IIDS Operational Network, running NT Workstation software. Workstations are normally considered clients to some server application(s). However, since a workstation can share its resources on the network, a server application could be run on the workstation, if its server requirements could be met.

Figure 2:
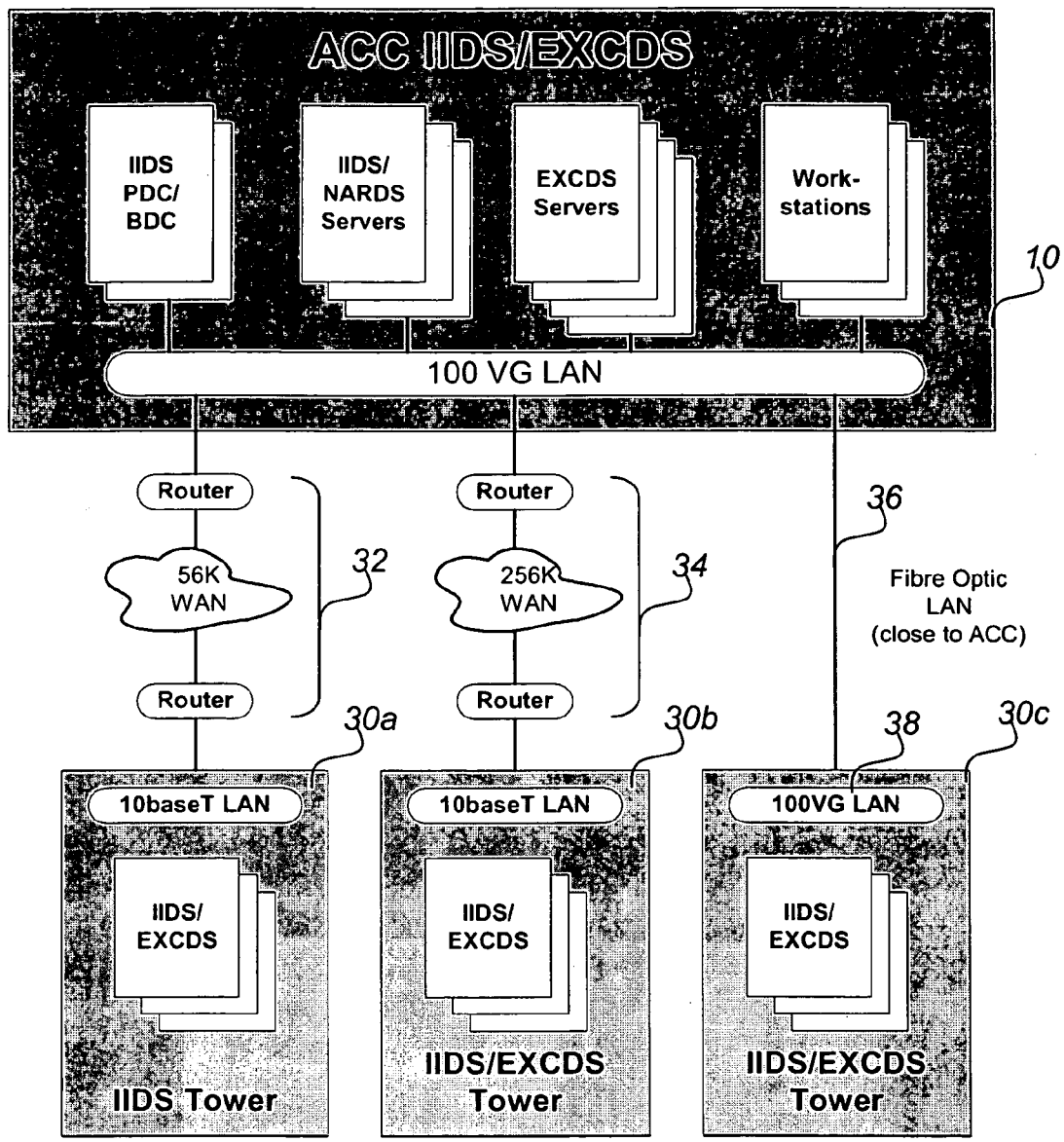
FIG. 2 illustrates in a block diagram the interactive information display system (IIDS) of FIG. 1 connected to a tower of an airport.

Referring to FIG. 2, there is illustrated in a block diagram the interactive information display system (IIDS) of FIG. 1 connected between an airport control center (ACC) and a tower of an airport and including components of an extended computer display system (EXCDS) in accordance with an embodiment of the present invention. The IIDS of ACC 10 is shown connected to tower 30 in three different ways.

The IIDS of ACC 10 connects to towers 30 via a WAN connection, or an extension to the ACC LAN. The WAN portion is supplied by an outside communications provider, and is currently available as a 56 kbits/sec 32 or 256 kbits/sec connection. The 56 k WAN is capable of supporting a Tower 30a IIDS installation alone (including NARDS, if a tower NARDS server is used). The 256 k WAN is required to support the additional bandwidth required by EXCDS for tower 30b. In either case, a 10baseT LAN is implemented in the tower.

If the tower 30c is located close to an ACC, a fibre optic cable 36 can be used to connect the tower directly to the ACC 100VG LAN. If additional bandwidth is required, a 100VG LAN 38 can be implemented in the tower as well, as shown for tower 30c.

TABLE A

| IIDS Software Components | |
| --- | --- |
| LogPlus | LogPlus synchronizes local system time with CTS time once per hour. |
| TimeServ | TimeServ synchronizes local system time to another system's local time. I.e., the system with a direct CTS connection. |
| Online | Online is installed at the TDM Workstation that monitors the operation of IIDS. |
| ISHA (IIDS Server Health Agent) | ISHA reports status to Online. |
| SHA (Station Health Agent) | SHA is installed on IIDS Workstations and it reports status to Online. |
| Control bar | Control bar is installed on IIDS Workstations and it is used to controls the execution of workstation applications, of which EXCDS is one. |

Figure 3:
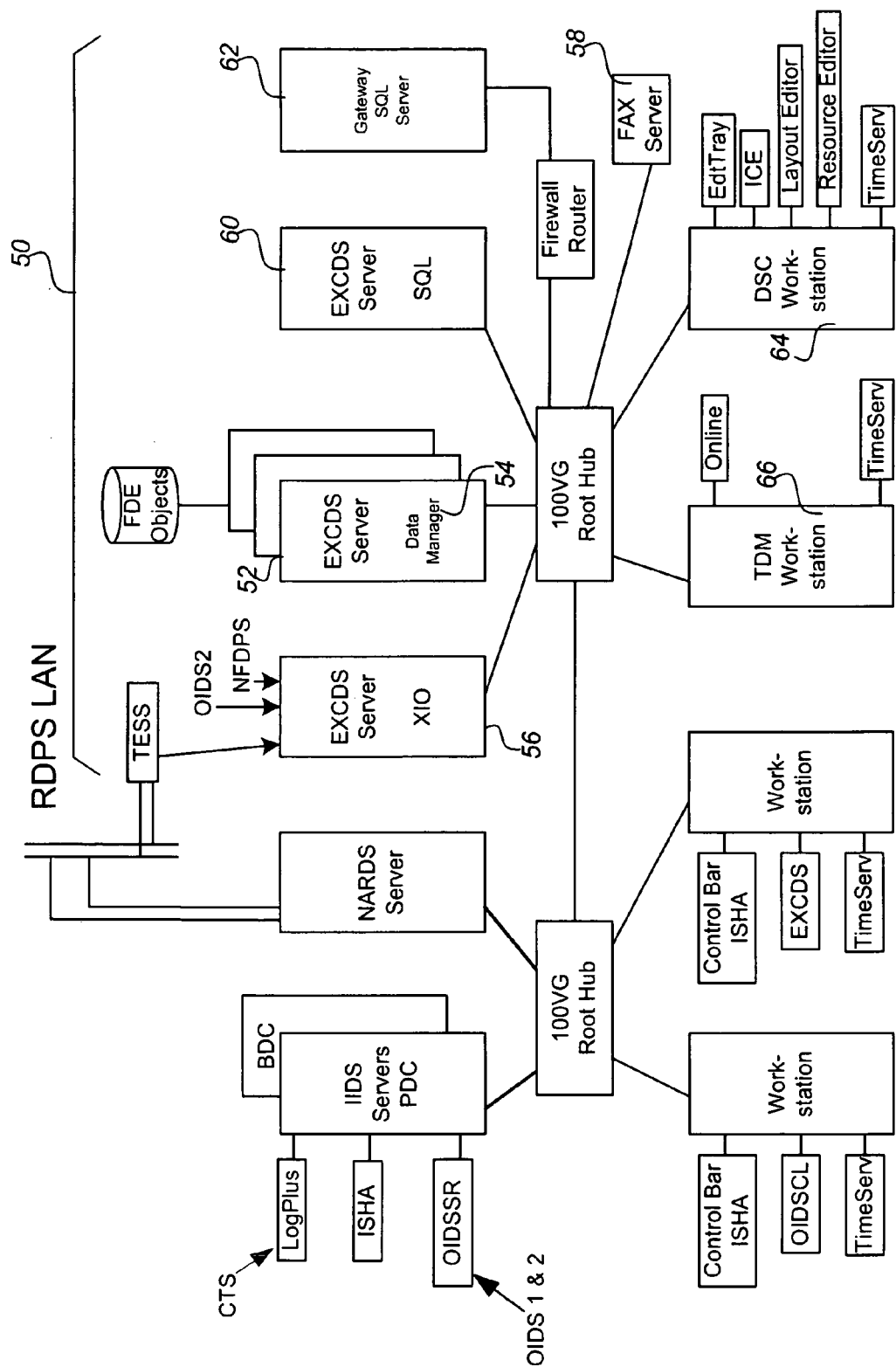
FIG. 3 illustrates in a block diagram an interactive information display system (IIDS) with additional components of an extended computer display system (EXCDS) in accordance with an embodiment of the present invention.

Referring to FIG. 3 there is illustrated in a block diagram an interactive information display system (IIDS) with additional components of an extended computer display system (EXCDS) in accordance with an embodiment of the present invention.

The EXCDS 50 operates on the IIDS Operational Network. IIDS PDC 16a and BDC1 16b handle system security and permissions. EXCDS servers are member servers on the IIDS Operational Network. By sharing the IIDS Operational Network with IIDS, EXCDS data can be presented on an IIDS workstation without any additional hardware.

The operational EXCDS 50 includes a server 52 with:
A Data Manager (DM) 54
Alternate Data Manager (Alternate DM) not shown in FIG. 3
An EXCDS XIO (eXternal Input/Output) server 56
A FAX Server 58
An EXCDS SQL Server (XSS) 60
A gateway SQL server (GSS) 62
DSC (Data System Controller) & TDM Workstations 64, 66.

FIG. 3 shows the EXCDS and IIDS components combined on the IIDS Operational Network. It should be noted that EXCDS database development is not done on the IIDS Operational Network, but on a DSC development/test LAN, which is not shown in FIG. 3.

Figure 4:
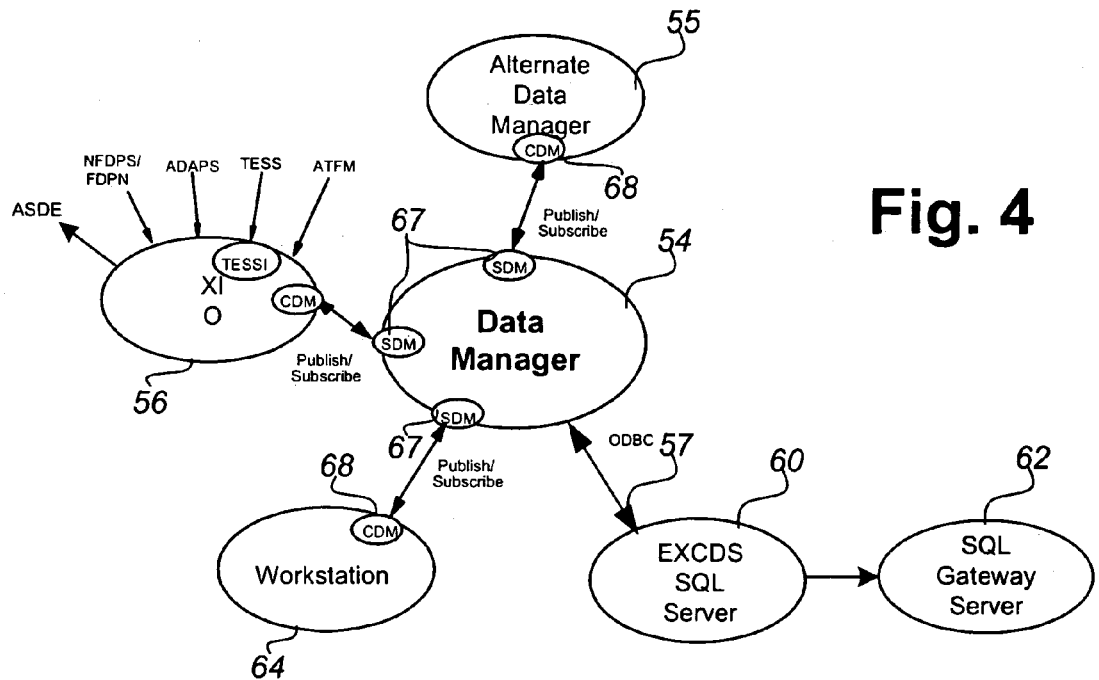
FIG. 4 illustrates in a functional block diagram data flow between the software components of the extended computer display system (EXCDS) of FIG. 3.

Referring to FIG. 4 there is illustrated in a functional block diagram data flow between the software components of the extended computer display system (EXCDS) 50 of FIG. 3. The functional components of EXCDS 50 are a data manager 54, an external input output XIO 56, an EXCDS SQL server 60 and a workstation 64. The data manager 54 is the central software component through which other components communicate. An alternate data manager 55 provides a backup status of the data manager 54.

In operation, EXCDS 50:
Operates at Tower, Terminal and Enroute Air Traffic Control (ATC) positions.
Incorporates business logic for automatic updating of flight data.
Provides a user interface for manual updating of flight data by air traffic controllers.
Permits the exchange of flight data between facilities and specialties.
Gathers data for billing, statistics and external information services.

An EXCDS workstation 64 is configured according to the requirements of its ATC position. Workstations have one or more panels, which are semantically the equivalent of data bays. Within each panel, flight data is displayed as Flight Data Entries (FDEs).

FDEs are updated by the Data Manager (DM) 54. While FDE updates are typically initiated elsewhere, e.g., from a workstation via controller interaction, change requests are always first sent to the DM 54, where the change is actually made. Once made, the change is then distributed to all subscribed positions.

This distribution of FDEs and their enclosed FDE data is central to the operation of EXCDS 50. The DM 54 routes FDEs to positions based upon upon 'subscriptions'. Some DM clients—for example, XIO 56—want the entire FDE list, so they subscribe to all FDEs. Workstations 64, on the other hand, subscribe only to those FDEs that meet the subscription criteria of their constituent panels, and they receive only FDEs whose 'state' meet these criteria. The DM 54 uses Subscription Lists to determine which FDEs should go where.

The DM 54 exchanges data over the network primarily via the EXCDS Publish/Subscribe paradigm. DM's Server Data Manager (SDM) module 66 handles the DM's portion of this protocol, while its clients use a software module called a Client Data Manager (CDM) 68. To keep things straight, the SDM 66 maintains a connection list of those computers who have subscribed to the DM 54.

Figure 5:
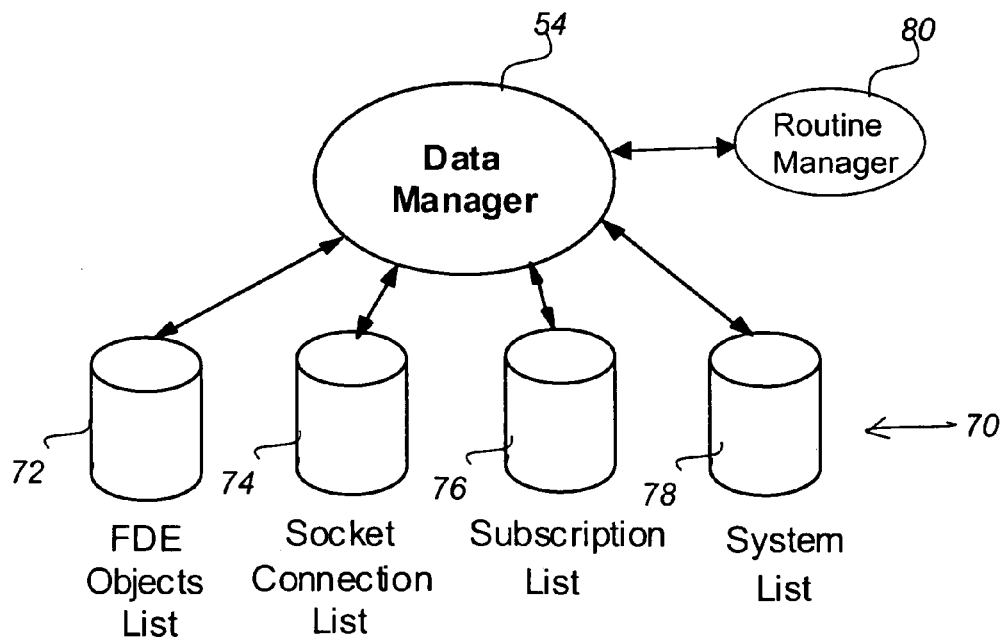
FIG. 5 illustrates in a block diagram the data manager of FIGS. 3 and 4.

Referring to FIG. 5 there is illustrated in a block diagram the data manager of FIGS. 3 and 4. The Data Manager (DM) 54 maintains data items or lists 70 (which may be referred to as databases), and controls the exchange of data items over the network.

DM 54 maintains the following data items:
FDE objects List 72 (flight plan data—one FDE Object per flight plan for the entire FIR)
Socket Connection List 74 (one socket connection per workstation)
Subscription List 76 (who has subscribed and for which data)
System List 78 (maintains the airport System Data displayed at a workstation, like special function indicator (SFI), runway visual range (RVR), wind, configuration data, etc. There is one system list for each adapted EXCDS System Airport.).

The EXCDS DM 54 also maintains a Routine Manager (RM) 80 functionality. This RM 80 functionality scans the FDE lists, looking for matches to a variety of conditions and states. When matches are found, the DM updates and redistributes the affected FDEs.

An EXCDS 50 typically has two DMs. There are 3 possible types of DMs. The DM that executes normal DM functionality, is referred to as a 'Primary DM'. There is only one Primary DM 54 at any time. Normal operation also includes an Alternate DM 55, in addition to the Primary DM 54. The Alternate DM 55 maintains a replicate of the Primary DM's database. If the Primary DM 54 fails, the Alternate DM 55 becomes the Primary DM.

In addition to being Primary 56 or Alternate Data Manager 55, the EXCDS Data Manager applications can assume another role in Slave Mode. In this mode, the Data Manager serves a localized set of workstations. This enables sites to cluster workstations in meaningful ways—for example, the workstations in a tower 30 would connect to their respective Slave Data Managers.

A DM in Slave Mode does not:

perform Database operations perform VSP, Arrival/Departure sequencing, Blink Checking, etc.

If a DM in Slave Mode loses its connection to the Primary Data Manager, it also breaks its connections with all workstations connected to it. Once its connection with the Primary DM is re-established, the affected Workstations reconnect to the Slaved DM. Note that in the normal start-up sequence, Workstation tries to connect to a DM in Slave Mode before it tries to connect to the Primary DM.

The Primary Slave DM, which exists only at towers 30, can take over as a DM for the tower when the connection to the ACC-based Primary DM 54 fails. Primary Slave DM is not online, and it does not receive updates from the Primary DM 54. A technician must manually activate the Primary Slave DM when it is needed.

Changes made to flight plan data are only made via the DM 54. If a change originates from another server or workstation, a change message is sent to the DM 54. It is the DM 54 that makes the actual change and redistributes the data to the other servers and workstations that require it.

DM system requirements are listed in Table B.

TABLE B

DM System Requirements

| Processor: | PIII, 1 GHz or higher |
|---|---|
| Memory: | 512 MB RAM or greater |
| Hard Disk Capacity: | 20 GB, 7200 RPM IDE |
| Video Card: | not critical |
| Video Monitor: | not critical |
| Network Interface Card: | 100 VG or switched 100 Base-T |
| System Software: | Windows NT Server version 4.0 with current approved Service Pack |
| SQL Software: | SQL Server 7.0 ODBC driver |
| Peripherals: | Mouse and Keyboard |

On startup, a DM attempts to locate and connect to the Primary DM 54. The DM first tries to connect to the last Primary DM 54 it was connected to. If this is unsuccessful, the DM then attempts to connect to each of the DMs in the list of DMs configured in the registry when the DM was installed. If connection to a DM can be made, the application continues to start as an Alternate DM.

If a DM cannot be found, the application's subsequent behavior is controlled by the SuppressDMListDlg registry entry. If SuppressDMListDlg is set to 1, the application tries the static list continuously until a DM is found. If Suppress-DMListDlg is set to 0, the Resolve Primary Data Manager dialog is displayed. This allows the user either to select the desired Primary DM, or to terminate the application.

Figures 6, 7:
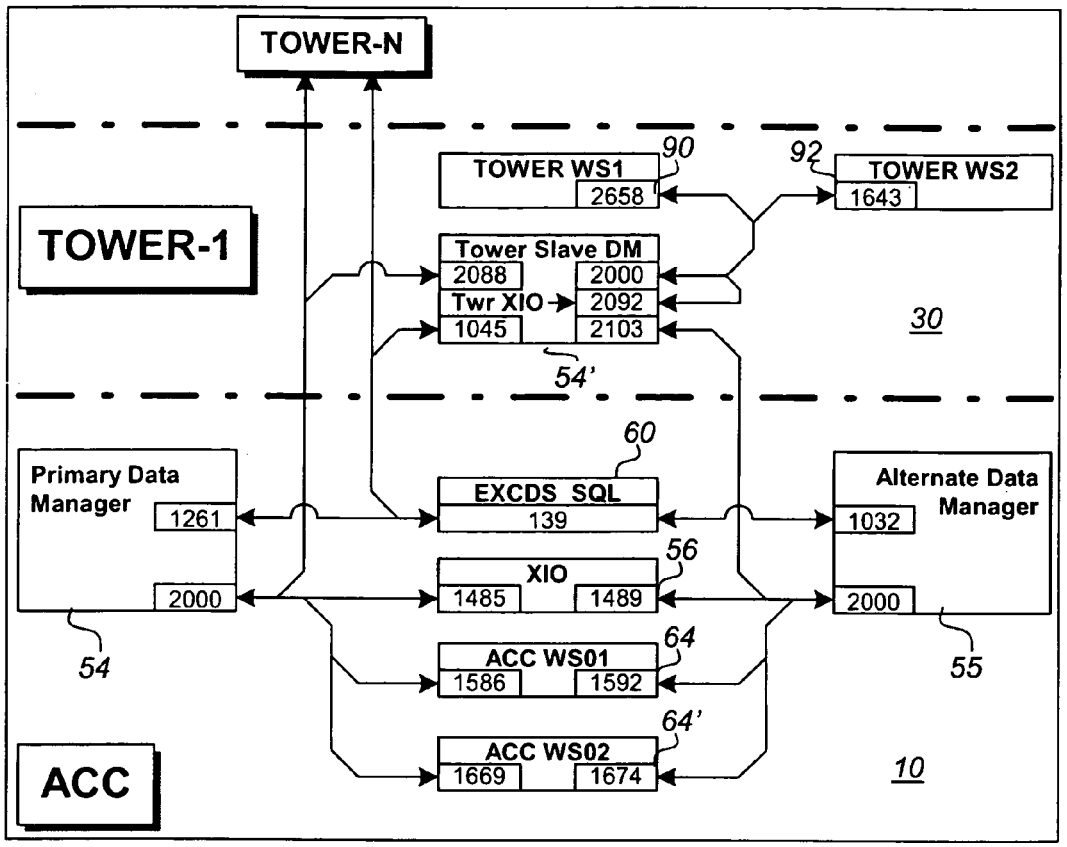
FIG. 6 schematically illustrates connections using sockets in the system of FIGS. 3 and 4.
FIG. 7 illustrates in a flight data entry list of the data manager of FIGS. 3 and 4.

Referring to FIG. 6 there is schematically illustrated connections using sockets in the system of FIGS. 3 and 4. Inter-process and inter-machine communication takes place via sockets. The server socket is part of the DM, and the client sockets reside on the other computers. In order for an application to communicate over the network, the application must open a client socket and then identify the corresponding server socket. Primary and Alternate DM 54 and 55 maintain a listening socket at a predetermined port address, for example port address 2000 or port address 3000. All EXCDS applications have this DM listening socket port address number soft-coded in the NT Registry during their installation.

When a client establishes communications with the DM, the listening socket responds to the client and enters the client into the "Client Socket Connections" list 74. Only one socket connection entry is made for each workstation application that connects to the DM, even though the workstation may have several data subscriptions with the DM.

The socket connection terminates automatically when a socket error occurs, or if a "wrong source" connects to the DM. When the workstation detects this loss of communication, it attempts to reconnect automatically.

DM 54 responses to requests are accomplished through an in-memory copy of all currently available data. All data changes are permanently recorded in a database, as well as the current state of all FDEs and System Data. At startup, the DM 54 loads the current list of FDE objects 72 and system data 78 from the database, for distribution to the Workstations.

The EXCDS database includes three main tables (FDE, System, and System Runway information) and the corresponding transaction logs for each table. The FDE, System, and System Runway tables all contain the current state of the data items. The corresponding transaction tables contain the state of all data-items as they are being changed.

At startup, the DM 54 posts two messages to the DB Agent. One message retrieves the state of the last recorded FDEs, excluding archived items; the other retrieves the last recorded system data, including RVRs. Once DB Agent has completed retrieval of the FDE list 72 and the system data list 78, these lists are placed in the output data queue. The DB Agent also posts one message for each data type to the DM, to inform it that there is information waiting to be loaded from the DB Agent output queue.

Upon receipt of FDE and System Data, copies are placed in the DB Agent's input data queue, and a message are sent to the DB Agent informing it there is data to process. In turn, the DB Agent determines the type of data—either FDE or System—and whether further processing is required. DB Agent determines if the data needs to be inserted or updated into the appropriate table in the database, depending on whether it is a new entry, or a modification to an existing data item. DB Agent only updates the current status of the data items in the database. Triggers exist in the FDE, System, and System Runway tables that update the appropriate transaction tables, providing a full copy of the current state of the data at that point in time. These transaction tables are maintained so that they represent the state of any FDE or System at any single point in time.

There is an automated SQL Server task scheduled to remove all entries from the database that are over 30 days old. The database is also used to generate NCAMS and OSTRIP reports, through the ENLink application. Also the EXCDS-NCAMS data link (ENLINK) uses these tables to tramsmit aircraft movement data to the NCAMS Application.

In order to track and manage changes to the FDEs, the EXCDS DM application logs all the changes made to an FDE. These include:

VSP modifications

Departure Sequence

Arrival Sequence

Global Attribute changes.

DM maintains four lists:

The Flight Data Entry List 72

The Client Connection List 74

The Subscription List 76

The Airport System Data List 78.

Referring to FIG. 7 there is illustrated in an example of a flight data entry list of the data manager of FIGS. 3 and 4. The flight data entry list includes FDEs that are not in an archived state (AR). Each FDE includes more than 80 different data fields or FDE data items.

Referring to FIG. 8 there is illustrated in a client connection list of the data manager of FIGS. 3 and 4. The client connection list 74 contains data about connections between DMs and their clients.

Referring to FIG. 9 there is illustrated in a subscription list of the data manager of FIGS. 3 and 4. The subscription list 76 lists the workstations that have subscribed to receive FDE data filtered on specific FDE data items (the subscriptions).

Figures 10, 12:
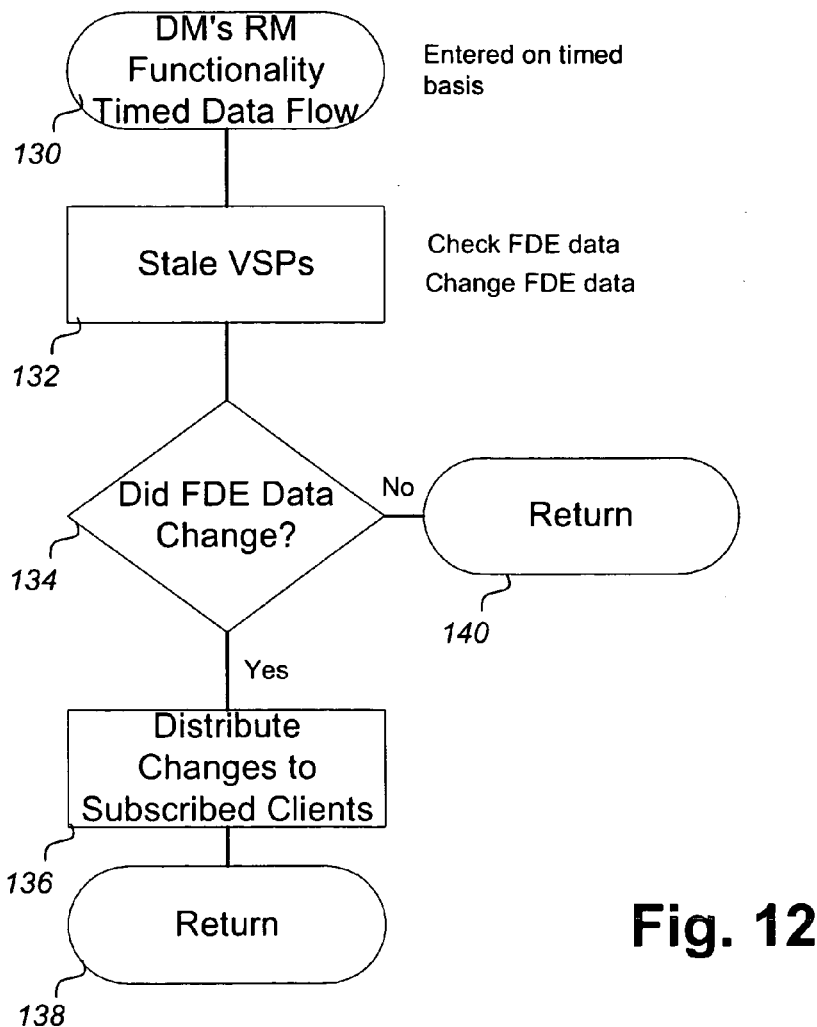
FIG. 10 illustrates in a airport system data list of the data manager of FIGS. 3 and 4.
FIG. 12 illustrates in a flow chart routine manager functionality for timed event.

Referring to FIG. 10 there is illustrated in a airport system data list of the data manager of FIGS. 3 and 4. The airport system data list 78 lists airport data for each defined airport in EXCDS 50. The airport system data list 78 is derived from the Airport System and the System Runway tables of the EXCDS Database. EXCDS is configured so that "blank" or empty values are not permitted for Airport Names or Airport Codes. Note the airport information in the status bar is "blanked out" if the system data has not been updated for a given amount of time. This time period is specified by the VSP SystemDataRefreshInterval. This feature can be disabled.

Special Function Indicators (SFI) and their corresponding arrival runways are held with system data. There are three fields in the system data lists—for primary, secondary, and tertiary arrival runways. These can be modified dynamically from the workstation, using the airport control. They can hold any valid SFI character, as decided by the adaptation.

Ideally, a one-to-one association should be established between a SFI and a DAR (Designated arrival Runway). A special string modifier, a colon (:), is used in the data change for exclusive SFI assignments. Exclusive SFI assignments ensure that the SFI assigned belongs only to the list to which it is being assigned. If the SFI is currently assigned to any other lists it is removed from them when the colon is used. Note that when the colon is used, only one SFI character can be specified. In addition to the standard Radar Data Processing System (RDPS) SFIs (A–Z), two special characters can be used.

An underscore (_) indicating unspecified RDPS SFI

An asterisk (*) indicating any valid RDPS SFI but not available in any of the SFI lists.

Consider the following examples. Table C shows all the DAR and SFI associated with each of them. Table D shows the RDPS SFI on the FDE and which arrival runway is auto-assigned.

TABLE C

DARs and Associated SFIs

| DAR | Runway | SFI List |
|---|---|---|
| Primary | 24L | L |
| Secondary | 15L | XY |
| Tertiary | 15R | *ABC |
| Quaternary | 33R | _R |
| Quintenary | | MNO |

TABLE D

Auto-Assignment of Arrival Runway

| RDPS SFI | Arrival Runway | How? |
|---|---|---|
| X | 15L | Matches secondary DAR |
| R | 33R | Matches quaternary DAR |
| L | 24L | Matches primary DAR |
| O | | Matches quintenary DAR; But no runway assigned |
| F | 15R | No direct match; But matches tertiary by the * |
|   | 33R | SFI unspecified; Matches quaternary by the _ |

During arrival processing in the XIO server 56, the SFI in the FDE is used to checked against these lists, and the matching arrival runway shown in the system data is automatically assigned for the FDE.

Each airport tracked by EXCDS 50 occupies one row in the Airport System Table. The fields of each row are known as an Airport System Data items. Weather-specific data items are updated automatically through XIO 56. Controllers make manual updates of non-weather data items through the selection of appropriate controls. A sample data set for the Airport System Table is shown in Table E.

TABLE E

Sample Airport System Table Data

| Airport System Data Field | Example |
|---|---|
| Airport | CYYZ |
| Atis | D |
| Wind_Speed_Direction_1 | 240/40G50 |
| Wind_Speed_Direction_2 | 230/35G55 |
| Altimeter_Setting | 2999 |
| DDR_Primary | 24L |
| DDR_Secondary | 24R |
| DDR_Tertiary | 15L |
| DAR_Primary | 33R |
| DAR_Secondary | 33L |
| DAR_Tertiary | 06L |
| Flow | 2 |
| Military_Count | 11 |
| Single_Engine_Count | 24 |
| Multi_Engine_Count | 15 |
| Jet_Count | 8 |
| Auto Mode/Flow Status String | OWReqDep |
| Last_Update_Time | 18:23:59 |
| Last_Update_Machine | Excds_xio_a:00031 . . . |
| DDR_PRI_TOWER_RELEASED | TR |
| DDR_SEC_TOWER_RELEASED | TR |
| DDR_TER_TOWER_RELEASED | tr |
| AIRPORT_TOWER_RELEASED | TR |
| ATTRIBUTES | *Y*GGR**** . . . |

The System Runway Table holds the RVR values of each runway for each adapted airport. The System Runway Table is updated automatically by the XIO 56. A sample data set is shown in Table F.

TABLE F

Sample System Runway Table Data

| AIRPORT | RUNWAY | RVR |
|---|---|---|
| CYOW | 06L | A60+ |
| CYOW | 06R | A60+B60+ |
| CYOW | 15L | A60+ |
| CYOW | 15R | A60+ |
| CYOW | 24L | A60+ |
| CYOW | 24R | A60+ |
| CYOW | 33L | A60+ |
| CYUL | 33R | A60+ |
| CYUL | 06R | A60+ |
| CYUL | 10 | A60+ |
| CYUL | 17 | A60+ |
| CYUL | 24L | A60+ |
| CYYZ | 28 | A60+ |

TABLE F-continued

Sample System Runway Table Data

| AIRPORT | RUNWAY | RVR |
|---|---|---|
| CYYZ | 06L | A60+ |
| CYYZ | 06R | A60+B60+ |
| CYYZ | 15L | A60+ |
| CYYZ | 15R | A60+ |
| CYYZ | 24L | A60+ |
| CYYZ | 24R | A60+ |
| CYYZ | 33L | A60+ |

The Data Manager 54 features a Routine Manager 80 functionality that scans through the DM's FDE list 72 looking for certain conditions and states. When an FDE that matches a particular condition or state is found, the DM 54 then updates and redistributes the modified FDE. This functionality, that is which conditions and states to look for, is configured in the Data Manager 54 by the Data Systems Coordinator (DSC).

There are three criteria that trigger this modification and redistribution process:
   FDE change events
   Airport Status items change events
   Timed events.

The modifications and updates which can be managed by this Routine Management functionality are:
   Immediate change to FDE data items based on FDE data conditions (Immediate VSPs)
   Timed event (delayed) change to FDE data items based on FDE data conditions (Stale VSPs)
   Detection of Duplicate FDEs based on FDE data items
   Processing of Tower Release functionality based on Airport System Data changes that result in changes to FDE data items
   Processing of Flow Control/Fax functionality based on Airport System Data changes that result in changes to FDE data items.
   Resetting the System Data feeder counters every hour at the top of the hour.

Table G summarizes this functionality:

TABLE G

"Routine Manager" Functionality

| RM Functionality | Configured by | Trigger | Description |
|---|---|---|---|
| Immediate VSPs | DSC | FDE data item change | Allows FDE data to be changed immediately IAW RM filters |
| Stale VSPs | DSC | Timed event FDE data item change | Allows FDE data to be changed on a timed basis IAW RM filters |
| Duplicate FDEs | Hard Coded + VSPs | FDE data item change | Checks for duplicate FDEs |
| Tower Release | Hard Coded + VSPs | Airport Status data item change | Configures FDE's Magic Bits for Tower Release functionality according to Airport System Data items |
| Fax for FDEs | Hard Coded + VSPs | Airport Status data item change | Configures FDE's Magic Bits for Flow Fax functionality according to Airport System Data items |
| Reset local counters | Hard Coded | None | Resets the Single, Multi, Jet and Military counts every hour on top of the hour |

For the purposes of tracking changes, every FDE or Airport data update is recorded with a field called Last Update Machine. This field contains the machine name and the unique application instance that inflicted the change. When recording changes as a result of the routine manager functionality, the Last Update Machine contains the machine name and the application instance of the data manager making the change.

Figure 11:
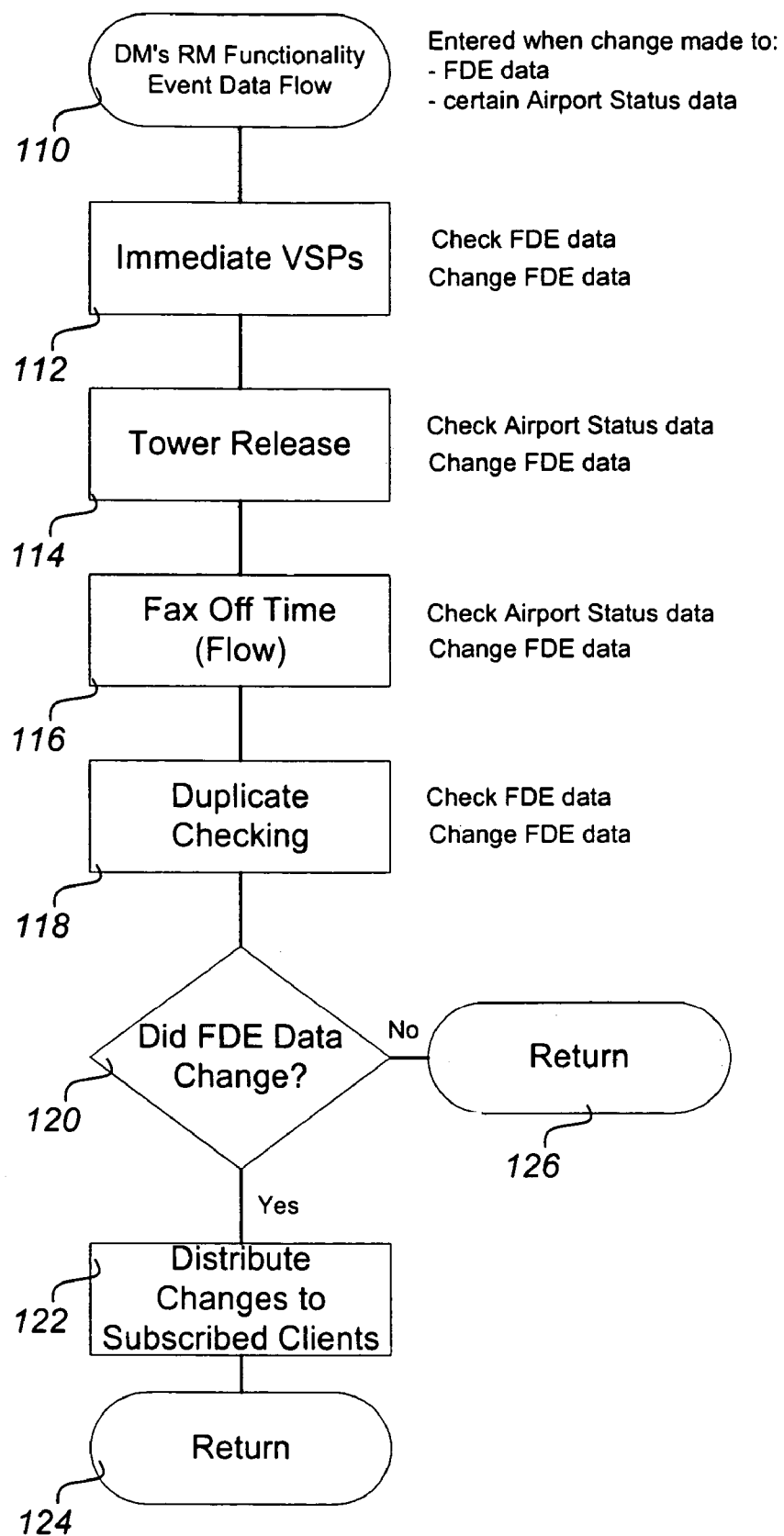
FIG. 11 illustrates in a flow chart routine manager functionality for data flow.

Referring to FIG. 11 there is illustrated in a flow chart routine manager functionality for data flow.

When there is a change in FDE data 110, the DM automatically checks the FDE against the Immediate VSPs list 112 to see if this FDE now qualifies for any changes. It might also check the FDE against other FDEs, looking for duplicates if appropriate.

The Routine Manager 80 function of the Data Manager 54 might also check the airport system data for FDEs meeting specific conditions, which might result in changes to FDEs as appropriate (114–118).

The FDE is processed through each stage, and data items are changed as necessary. When all checks have been completed 120, a change message is issued. The DM makes the modifications and distributes the changes to subscribed clients 122. The structure of this process means that changes made to an FDE in an earlier segment of the change can be overwritten at a later time without issuing a change notice for each change.

This reduces the amount of network traffic coming from the DM (which could be considerable) but forces the DSC to carefully consider the order of changes being made to FDEs.

Referring to FIG. 12 there is illustrated in a flow chart routine manager functionality for timed event.

Timed Event processing 130 is not related to a control-initiated event. A timer is used to trigger processing related to "Stale VSP" checking 132, and this processing is separate from the "change event" processing just described.

The FDE is checked against all Stale VSP entries in the list, and changes are made to the FDE at each step, as appropriate. If FDE data is changed 134, the DM is sent an FDE change message only at the end of the processing segment 136. All Stale VSPs are checked, and then a message is sent.

Figure 13:
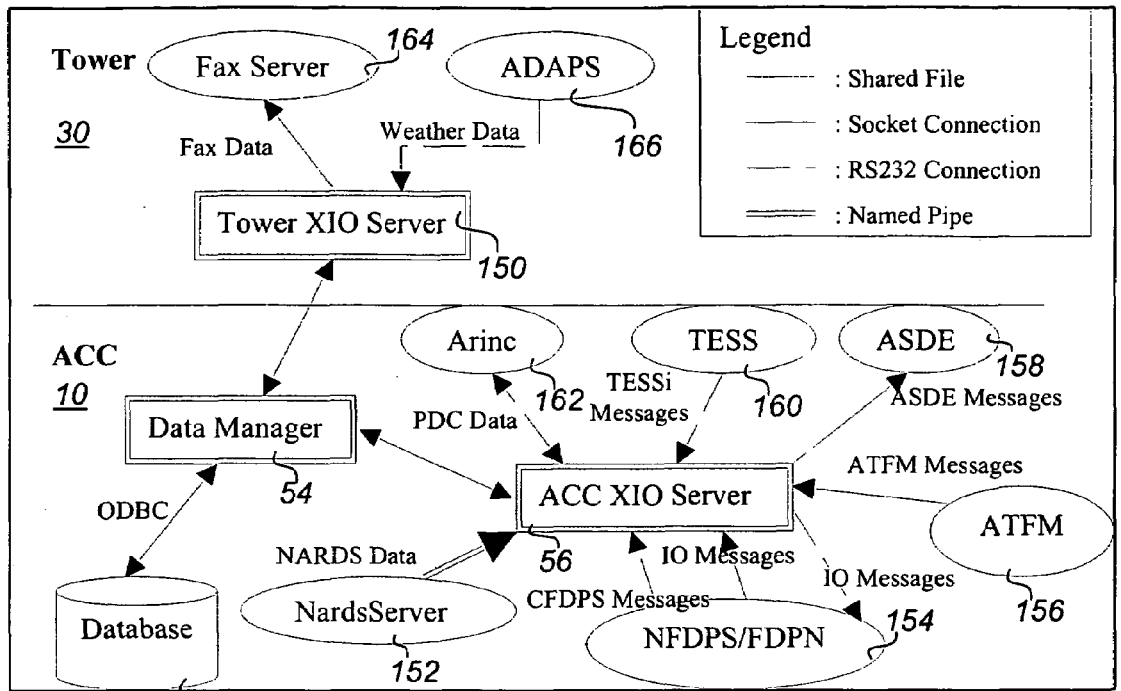
FIG. 13 illustrates in a block diagram data flow for the external input/output XIO of FIGS. 3 and 4.

Referring to FIG. 13 there is illustrated in a block diagram data flow for the external input/output XIO of FIGS. 3 and 4.

Figure 14:
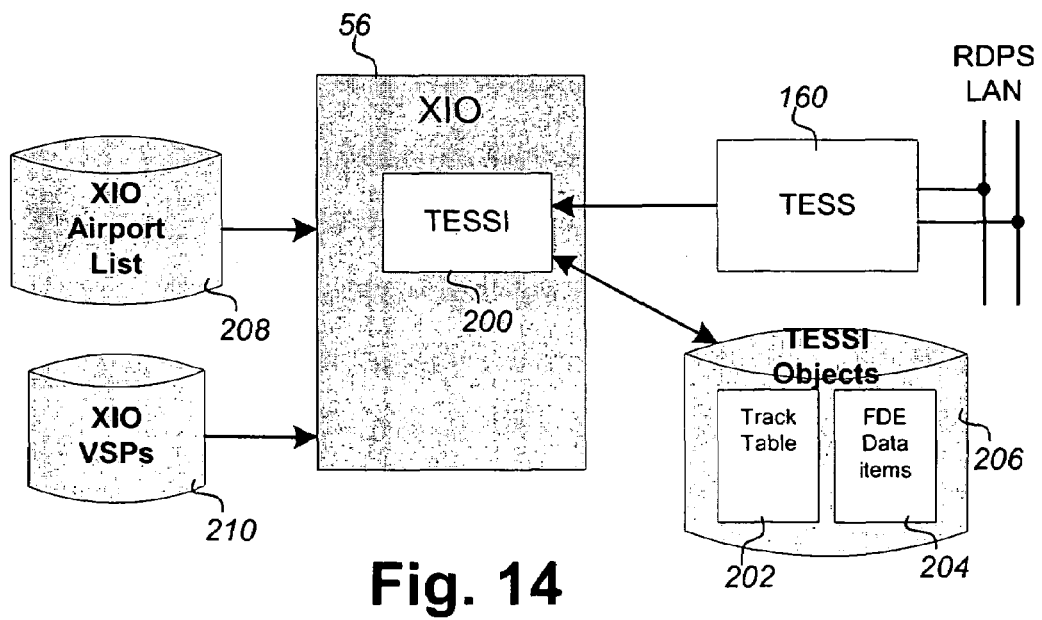
FIG. 14 illustrates in a block diagram the external input/output XIO of FIGS. 3 and 4.

Referring to FIG. 14 there is illustrated in a block diagram the external input/output XIO of FIGS. 3 and 4, a traffic extraction subsystem (TESS).

Figure 15:
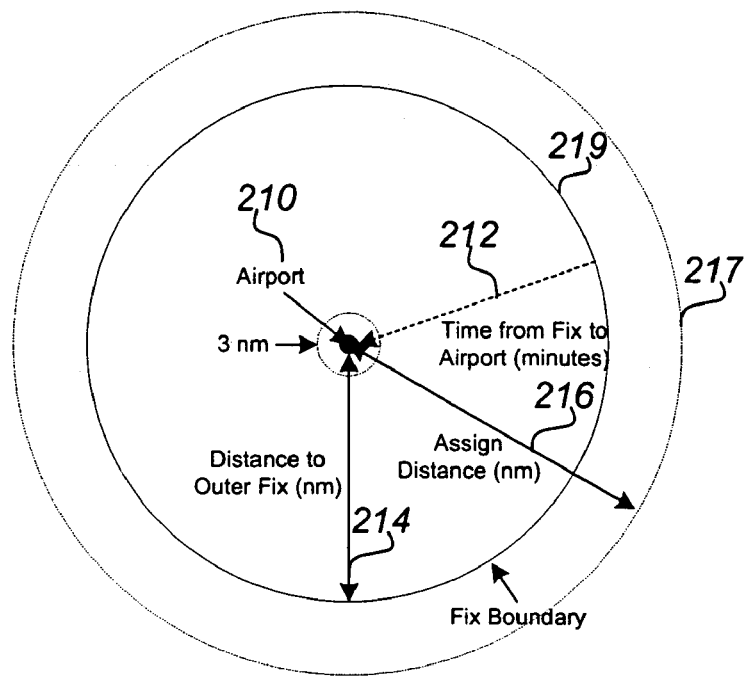
FIG. 15 graphically illustrates traffic extraction subsystem (TESSI) airspace dimensions.

Referring to FIG. 15 there are graphically illustrated traffic extraction subsystem (TESSI) airspace dimensions.

The Traffic Extraction Subsystem (TESS) 160 passes Random Data Processing System (RDPS) track update messages to the XIO 56 via an RS232 connection 100. XIO 56 incorporates a TESSI (TESS Interface software), which allows the XIO 56 to generate estimates on certain flights. The EXCDS 50 uses these estimates for its initial sequencing of arrivals. The EXCDS 50 can also use the radar updates to advance the state of an aircraft if desired. For example, an FDE with a Planned Arrival (PL) state could be automatically updated to Airborne upon receipt of a radar track update message for that aircraft. The EXCDS 50 supports automatic FDE generation based on RDPS tracks.

EXCDS 50 is capable of tracking the CJS associated with an FDE, because the TESS 160 provides this data with the track updates. Each FDE includes a CJS Data item, which is accessible from the resource level, and has a Display ID or Change ID associated with it. The CJS value is obtained from the track update message and is inserted into the CJS Data item by the software. CJS tracking statistics are amongst those maintained by the SQL server, and can be observed there.

CJS Tracking can be enabled/disabled by the registry settings listed in Table H.

TABLE H

CJS Tracking Registry Settings

| VSP | Value | Description |
| --- | --- | --- |
| CJSTracking | 0 | CJSTracking is off |
| CJSTracking | 1 | CJSTracking is on |

In operation, the XIO 56 receives track updates from the TESS 160 at the rate of one track update per aircraft per minute. The XIO module that handles these updates is TESSI (TESS Interface) 200. The following describes the processing that TESSI 200 performs on the track updates:

1. XIO 56 subscribes to the FDE list from DM.
2. The XIO TESSI module 200 receives track updates from TESS and stores them in a Track Table 202.
3. The Track Table 200 and FDE table 200 are linked (as TESSI Objects) 206 to ensure that an FDE exists for every track in the Track Table that has qualifying flight plan data (as received from RDPS).

In addition, the XIO 56 maintains a list of adapted airports 208 that specify airport name, position and fix boundary distance. This list is used to generate estimates and state changes.

The XIO 56 also maintains Registry settings 210 that are used as VSPs to enable certain functionality.

The XIO 56 performs the following functions with relation to track data received from RDPS:

Store track data in the TESSI Track Table 202.
Create new FDE.
Change FDE's SSR code.
Maintain TESSI States that define the current status of an entry in the Track Table.
Calculate and update an estimate for ETA/Runway Time and Fix Boundary Time based on track data.
Provide for the automatic assignment of the Arrival Runway.
With help from the Data Manager, XIO also:
Changes an arriving FDE's state from PL to AB shortly after receiving track updates.

Every time a track update is received, TESSI 200 updates the Track Table 202 with the newly-received track information, creating a new track entry if required.

The TESSI 200 then attempts to match the FDE data 204 with the Track Table data 202. This process allows for the automatic correction of SSR code from the track data. In addition, if a matching FDE does not exist and if the VSP TrackInitiatedFlightPlan is enabled (default is OFF), a new FDE is created.

EXCDS 50 compares the flight plan data contained in the track update with the FDE list 204, to ensure that an FDE exists for each track that has flight plan data.

If EXCDS 50 receives track data from TESS 160 for which an FDE does not exist, EXCDS generates a new FDE containing the known flight plan data (extracted from the track update). As a minimum, the new FDE contains the ACID, DES, SSR code and an initial state of PL.

The XIO registry settings listed in Table I determine whether this functionality is enabled.

TABLE I

XIO/TESSI FDE Creation Registry Settings

| VSP | Value | Description |
| --- | --- | --- |
| TrackInitiatedFlight Plans | 0 | Do not automatically create a new FDE. |
| TrackInitiatedFlight Plans | 1 | Automatically create a new FDE based on track update message. |

Referring to FIG. 15, before the TESSI 200 can calculate estimates and change states, it must be aware of the following factors:

Airport name 210
Airport x, y offset
Time in minutes needed for all aircraft to go from outer fix to airport, 212
Distance from airport to outer fix in nm 214 (which is configured as a circle centred on the airport offset)

Assign Distance 216—the distance from airport at which automatic arrival assignment should take place (a circle centred on the airport offset)

Airport Altitude.

These factors are stored in the XIO 56 Airport List 208.

Upon early detection of a track update, one of the first checks performed is the assignment of a TESSI state. This is often done on the first track update for that flight. The TESSI 200 checks to see if the track qualifies as an arrival. If so, then the TESSI state is changed to TESSI Airborne Arrival, and a message is sent to the DM. Normally, an arrival is detected some distance from the airport. The DM sees the TESSI state change, and changes the arrival's FDE state from PL to AB.

Figure 16:
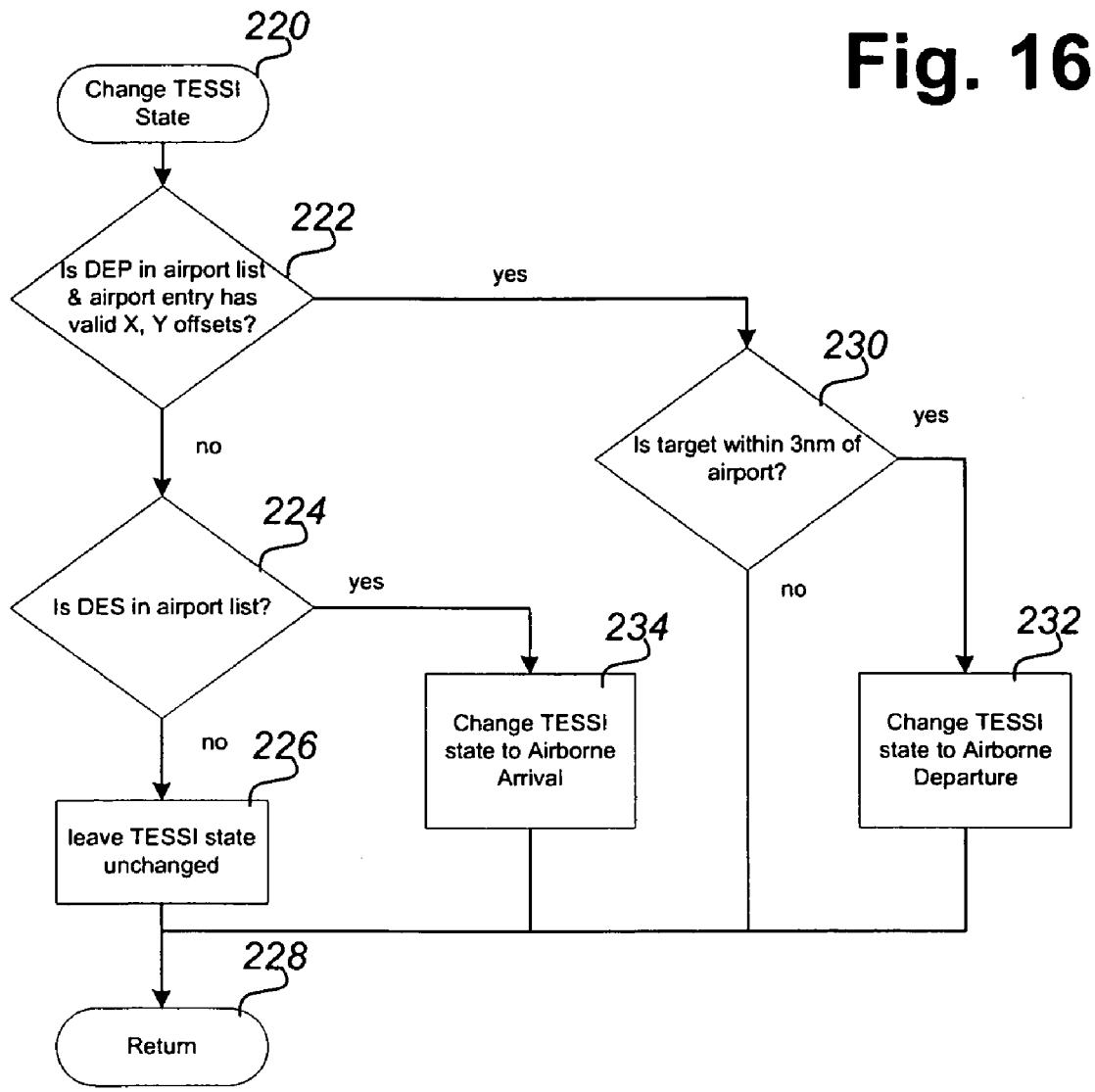
FIG. 16 illustrates in a flow chart the steps performed by the XIO.

Referring to FIG. 16, there is illustrated in a flow chart the steps performed by the XIO 56. The XIO TESSI processing begins at 220 "Change TESSI state". First DEP and x, y offset validity are checked in airport list at 222. If no, DES is not in airport list as confirmed at end of 224. The TESSI state is unchanged at 226 and processing returns 228. If the DEP and x-y offsets in list and largest distance of less than 3 nm is determined at 230. If No, processing ends at return 228, if yes, TESSI state is changed to Airborne Departure at 232. If DES is in airport first as determined by 224, the TESSI state is changed to Airborne Arrival by 234.

Figure 17:
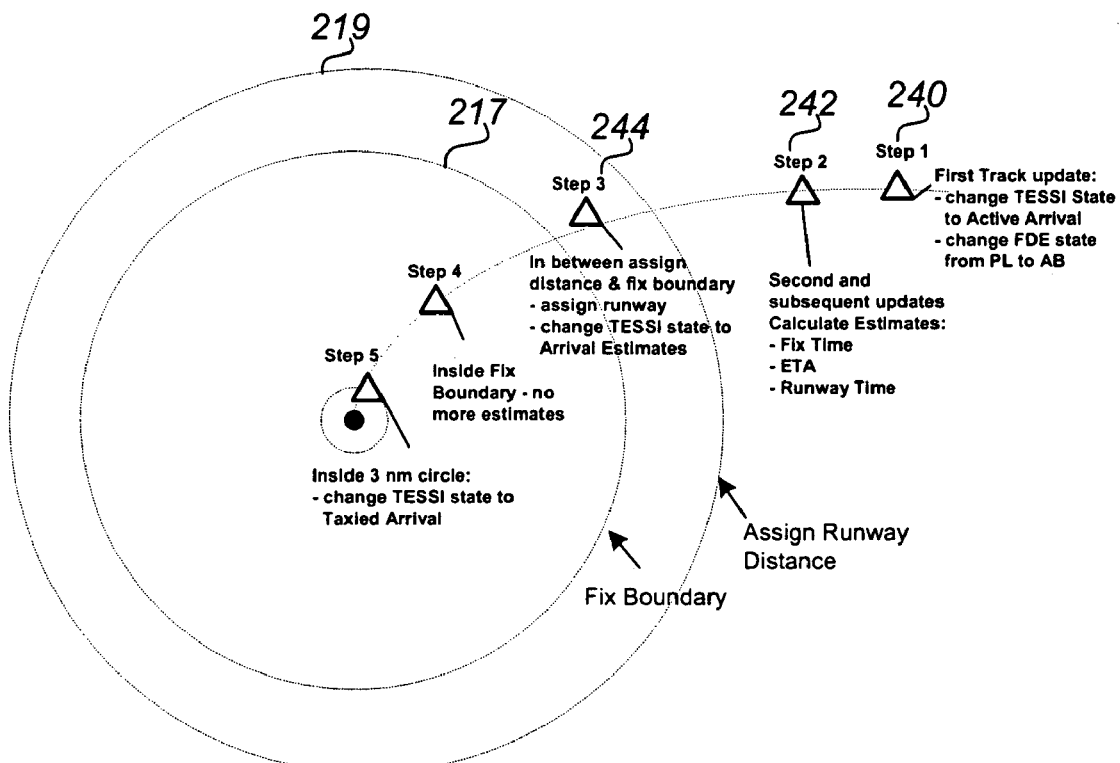
FIG. 17 graphically illustrates the TESSI arrival processing.

Referring to FIG. 17 there is graphically illustrated the TESSI arrival processing. TESSI Arrival processing performs the following sequence of steps:

Changes TESSI State to Airborne Arrival 240
Calculates and updates estimates to Fix Boundary 242
Determines Fix Boundary crossing and assigns runway 244
Determines Arrival event.

Under normal conditions, the TESSI Active Arrival state is assigned on the first track update 242. On the second track update, TESSI starts estimating the track, and continues to calculate estimates until Fix boundary crossing 244. TESSI provides the estimates listed Table J

TABLE J

TESSI Estimates

| Name | FDE Data Item | Description |
|---|---|---|
| Fix Time | TES Fix Time | This is the time at which the flight crosses the Fix Boundary based on the flight's current position and speed. |
| ETA | ETA | This is the Fix Time + "Time from Fix to Airport" time entered in the XIO Airport List |
| Runway Time | TES Runway Time | This is the same time as ETA |

TESSI 200 calculates estimates for the three data items of Table J on receipt of each track update, until the track crosses the Fix Boundary 219. If, before crossing the Fix Boundary 219, subsequent estimates change by 2 minutes or more, then TESSI updates the affected data items.

When the track crosses the Fix Boundary 219, TESSI stops calculating the estimates. If the FDE arrival runway is blank, TESSI then assigns an arrival runway according to the following rules:

When the track is in between the Assign Distance 217 and the Fix Boundary 219, automatic arrival runway assignment takes place. The LOC field is checked against Primary, Secondary, Tertiary, Quaternary and Quintenary SFI lists. If a match is found, the corresponding Designated Arrival Runway is assigned to the FDE. If there are no matches, no arrival runway is assigned.

The following behaviours should be considered in order to understand the dynamic nature of automatic arrival runway assignment:

As long as the track update is received inside the two circles, an attempt is made to update the arrival runway. If the arrival runway has changed during this time, the change takes effect, unless the SFI-DAR matching algorithm could not find a match.

Auto arrival runway assignment happens only upon receiving track updates. If the SFI is further modified, for example by NavCan Auxiliary Radar Display System (NARDS), the flight plan in EXCDS reflects the modification. No arrival assignment process takes place, unless the NARDS modification is relayed back to RDPS, which consequently updates EXCDS via TESSI.

Changing the runway for a designated arrival position does not change the already-assigned runways in flight plans with the corresponding SFI.

Although not the usual sequence, if an arrival is detected for the first time inside the Fix Boundary 219, then TESSI 200 sets the ETA and the Runway Time to the current time+"Time from Fix to Airport" time obtained from the XIO Airport List. Once inside the Fix Boundary, TESSI no longer calculates estimates. When the track crosses the 3 nm boundaries, TESSI changes the TESSI State to TESSI Taxied Arrivals, and sends a message to the Data Manager 54. The TESSI states are listed in Table K.

TABLE K

TESSI States

| TESSI State | Description |
|---|---|
| Blank | No track updates received |
| TESSI Radar Active | Overflight - Received track update but FDE's DEP or DES not in XIO Airport List |
| TESSI Active Arrival | Arrival - Received track update and FDE's DES in XIO Airport List |
| TESSI Arrival Estimate | Arrival has crossed Fix Boundary |
| TESSI Taxied Arrival | Arrival has crossed 3 nm boundary |

Figure 18:
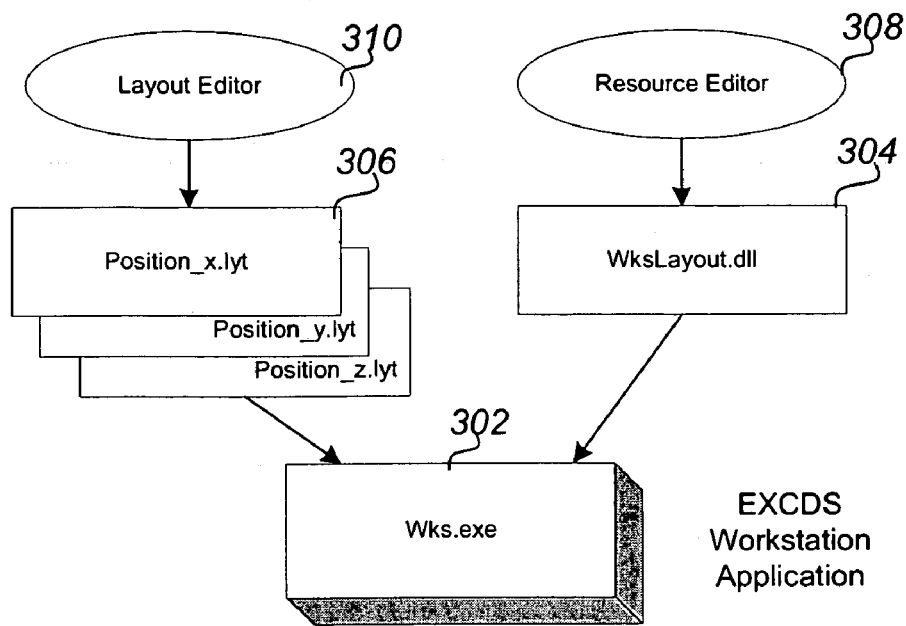
FIG. 18 illustrates a workstation application.

Referring to FIG. 18 there is illustrated a workstation application. The Workstation application performs the following functions:

Displays FDE data to a controller in an interactive paperless environment.

Establishes and maintains screen panels.

Filters the complete FDE objects sent from the DM, and determines which portions of these FDEs should get displayed, and in which panels, in accordance with prescribed Subscriptions.

Creates and populates windows to represent FDEs according to the resources specified for each panel, including inserting and sorting FDEs.

Sends updates originated by the workstation user to the DM.

The workstation application 300 includes a program file (wks.exe) 302, a file of resources that represent FDEs, panels, and Status Bars (WKSLAYOUT.DLL) 304, Workstation layout files (*.LYT) 306 that contain panel definitions, and various files containing online help and their associated indexes. Resource 308 and layout 310 are used to make changes to the resource and layout files respectively.

A workstation can either run the Workstation application software alone, as when a touch screen is used in the case of some tower and terminal positions, or in combination with IIDS software, as is the case for an enroute sector and some terminal sectors.

Note that the Workstation application, like all other EXCDS applications, features Auto-Recovery. Should repeated application errors occur, the EXCDS Workstation application automatically shuts down and restarts the computer. The thresholds, or triggers, for these events can be customised by the DSC.

Hardware used for the Workstation shall comply with the minimum system requirements listed in the table below.

TABLE L

Workstation System Requirements

| | |
|---|---|
| Processor: | Pentium MMX 166 MHz |
| Memory: | 64 MB EDO RAM WITH 256 TO 512 KB PB Cache memory |
| Hard Disk Capacity: | 2 GB Ultra-Wide SCSI hard disk, 7200 RPM, 512K cache |
| Hard Disk Average Access Time: | 10.5 ms or less |
| Peripheral Interface Type: | Adaptec AHA2940UW SCSI Wide |
| Sound Card: | Creative Labs AWE64 Value Sound Card |
| Video Card: | 4 MB Matrox Millenium |
| Video Monitor: | 21" Nanao/EIZO, 2K × 2K Sony (FMA), 20" touch, 17" |
| Network Interface Card: | Compatible PCI LAN controller |
| System Software: | Windows NT Server version 4.0 SP3 or higher |
| Peripherals: | Mouse and Keyboard |

The workstation application can be run on three hardware configurations:
Dedicated Touch Screen
Dedicated Normal Screen
Window on IIDS.

EXCDS workstations come with a built-in option for data entry using their keyboard. The conventional virtual keyboard and IDC_EDIT features are still supported. It is highly recommended that these two features (virtual keyboard and real keyboard) NOT be mixed. Enabling keyboard entry in a pop up with IDC_EDIT control results in unpredictable behaviour.

Figure 19:
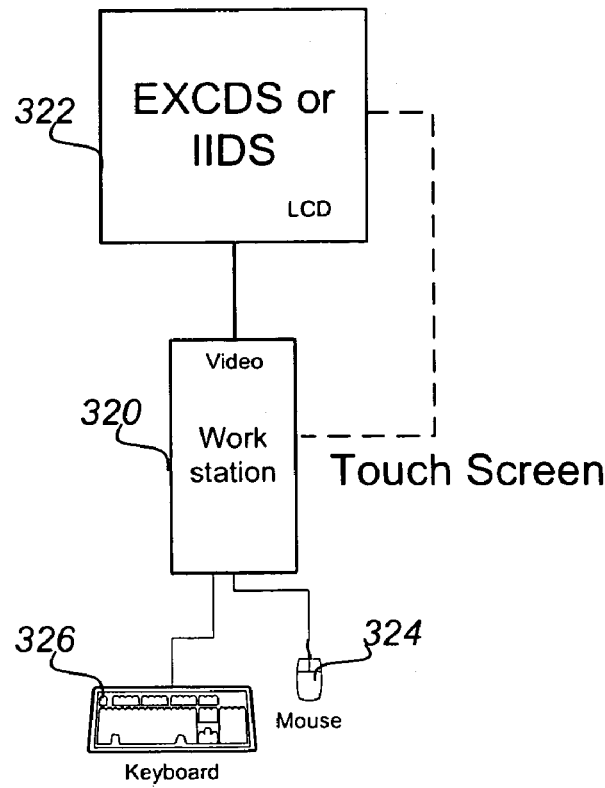
FIG. 19 illustrated in a block diagram, dedicated touch screen configured workstation for a tower position.

Referring to FIG. 19, there is illustrated in a block diagram, dedicated touch screen configured workstation for a tower position. A workstation 320 in this configuration runs EXCDS 3 as its primary application, and uses a touch screen LCD 322 as the input/display device. Other IIDS display applications are usually not running. The touch screen has one mouse pointer. This can be moved on the screen via the mouse 324, or by means of the touch screen 322. The keyboard 326, or keyboard 326 and mouse 324, can also be used to enter and/or manipulate data.

When a touch screen 322 is used, the mouse pointer 324 cannot be made to cross from one screen to another. For this reason, each touch screen must have its own workstation. This position is suitable for tower positions, where EXCDS is the primary mechanism for displaying flight data. There are two types of touch screen technology available: capacitive and resistive.

Figure 20A:
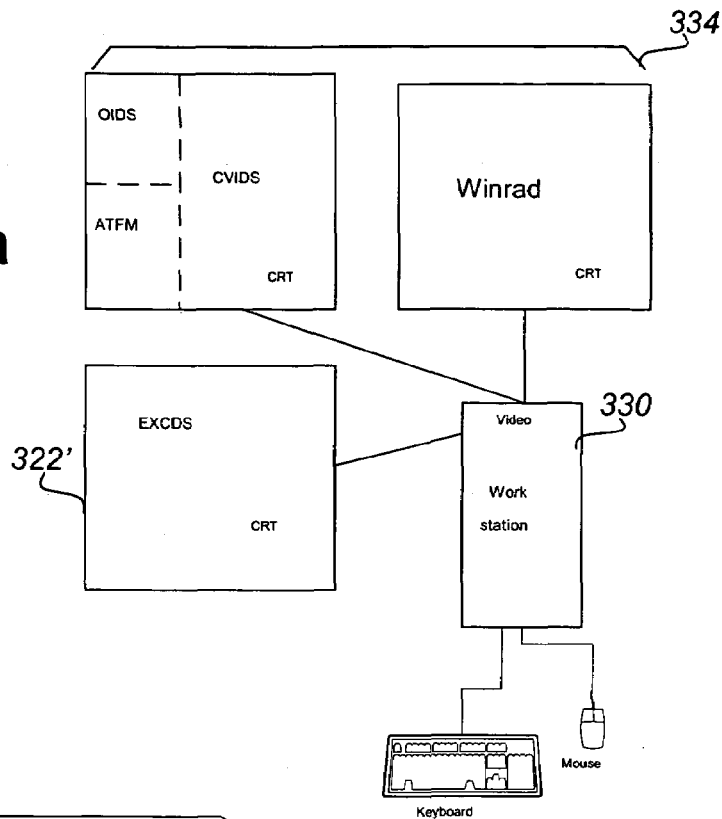
FIG. 20a illustrates in a block diagram, a dedicated normal screen configured workstation, for a terminal position.

Referring to FIG. 20a, there is illustrated in a block diagram, a dedicated normal screen configured workstation, for a terminal position. A workstation 330 in this configuration runs EXCDS3 application on an IIDS type of monitor (21" CRT) 332, as well as IIDS applications on other monitors 334. The CRT combination is a suitable combination when the manipulation of EXCDS data is not intensive. The keyboard, or keyboard 330 and mouse 338, can be used to enter and/or manipulate data.

Figure 20B:
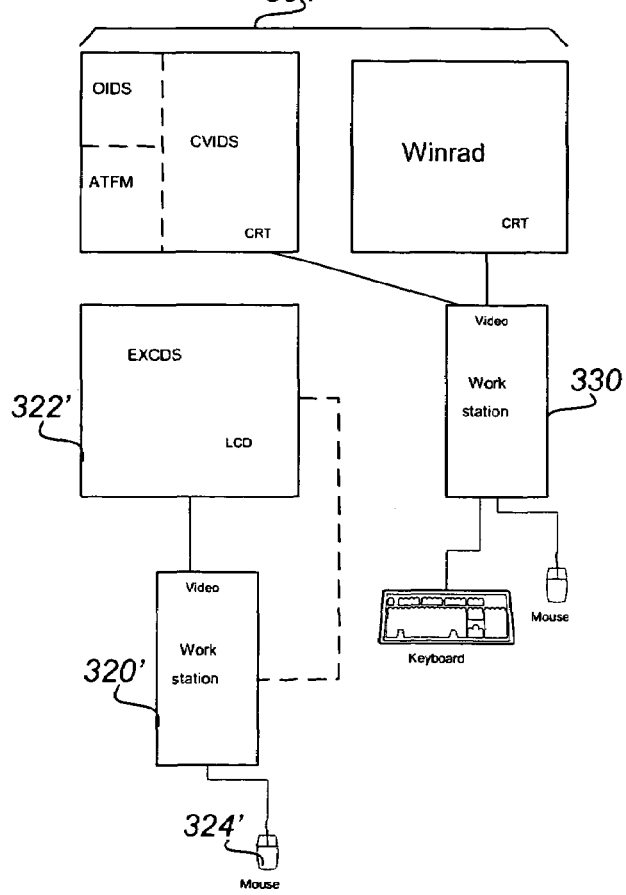
FIG. 20b illustrates a terminal position using the touch screen workstation of FIG. 19.

Referring to FIG. 20b, there is illustrated a terminal position using the touch screen workstation of FIG. 19. If the EXCDS portion of a workstation is set up with a Touch Screen 322, an additional workstation is required to handle the Touch Screen inputs. This is a suitable combination when the manipulation of EXCDS data is intensive.

A workstation can also be configured to run the EXCDS application, as well as other applications, on an IIDS-based machine with a 21" CRT (not shown). The CRT combination is a suitable combination when the manipulation of EXCDS data is not intensive. The keyboard, or keyboard and mouse, can be used to enter and/or manipulate data.

The Workstation subscribes to the DM for data required to populate the Status Bar and FDEs. The Workstation subscribes itself to all Airport System Data, but each panel subscribes to its own subset of FDE data. This mechanism controls which FDEs are displayed at which panel.

In the event of a DM failure, the Workstation, like other DM clients, talk to the next DM on its Client Connection List, and confirm that DM's role as Primary DM. Workstation then exchanges data with this new Primary DM.

Note that since the Alternate DM subscribed to all the lists from the Primary DM, it knows about all the subscriptions of all the clients. When it takes the role of Primary DM, it automatically publishes any change in data to its known subscribers. Workstation Application Files.

The Workstation application 300 requires the files listed in Table M below.

TABLE M

Workstation Application Required Files

| | |
|---|---|
| Workstation Application Executable | One copy of the workstation application executable, Wks.exe, is required per Workstation application configuration. |
| Position Layout File | Each Workstation application configuration requires one Position Layout File. The layout file:<br>defines the operational position functionality of a particular workstation<br>defines what is displayed on the workstation screen<br>determines which flight plans are displayed in each panel of the workstation screen.<br>Layout files have the 'lyt' extension and are usually named to reflect the position for which they are intended - for example, ClearanceDelivery.lyt, or NorthGround.lyt. Once launched, the workstation performs the functions defined by the layout file until the application is restarted and another layout selected. Layout files are created and maintained via the Layout Editor. |
| Resources Definition File 304 | WksLayout.dll, a Resources Definition File, is required for a Workstation application configuration. WksLayout.dll contains the Dialogs and Controls that can be used by the Workstation Application to present data in the desired formats. This file is created, compiled, and maintained with the Visual Studio C++ Resource Editor. |

The Workstation's display includes seven principal elements:
Main Frame
Menu
Panels
Panel Headers Status Bar FDEs Popups.

Figure 21:
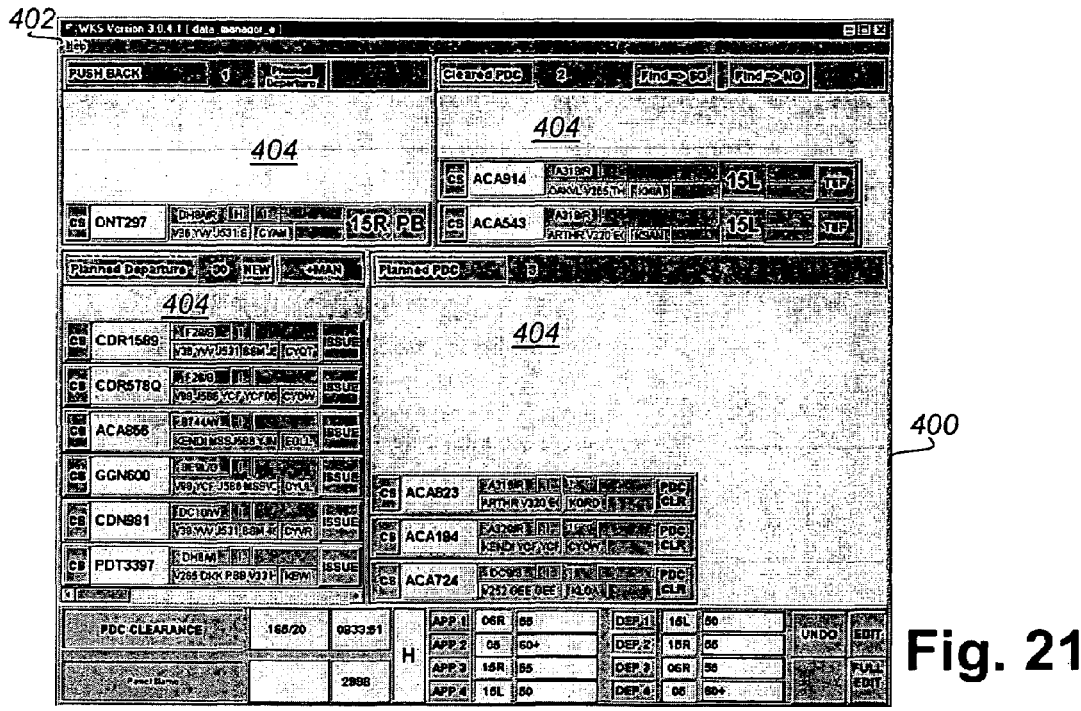
FIG. 21 illustrates an example of a main frame for the workstation application.

Referring to FIG. 21, there is illustrated an example of a main frame for the workstation application. The Main Frame 400 is the window that contains other principal display elements of the Workstation application:

A Menu 402

Splitter panels 404, the size and number of which are established in the Layout Editor.

Each panel usually consists of a header, scroll bars, and FDEs. The panels in the splitters display and manipulate FDE data.

The FDEs, in turn, consist of FDE controls, which are used to display and manipulate FDE data. FDE controls are created in the Resource Editor, and reside in the resource file WksLayout.dll.

A Status Bar is usually located at the bottom of the Main Frame. The Status Bar is used to display and manipulate airport or System Data. The Status Bar also uses FDE controls to display and manipulate System Data. Note that airport information in the Status Bar is "blanked out" if the System Data is not updated for a period of time, as specified by the VSP SystemDataRefreshInterval. The Status Bar is used to display and manipulate System Data.

The same display object is contained within the splitter panels, headers, FDEs, and popups. Each display object contains its own copy of FDE data, and, optionally, a pointer to an FDE data object in a collection. Display objects can spawn children that have their own copy of FDE data. These are usually used as popups—for example, to change a runway. Each spawned child is linked in a chain to its parent, so that any change to the underlying FDE data is propagated through the chain.

Headers are treated slightly differently, since the FDE data is usually a copy of a "picked FDE". Headers also can contain the panel name used in the subscription to the Data Manager. The panel name is part of the systems addressing scheme, which allows the system to locate and change specific FDEs in the system. A counter may also be present. This is used to indicate the number of FDEs in the panel's collection. Status Bars differ from FDE display objects, in that the underlying data is system or airport data, rather than flight plan data. Status Bars are "docked" at the top or bottom of the main frame. There is only one Status Bar per mainframe. The Status Bar object can also spawn children, to implement popups for DAR change etc. FDE controls placed on the Status Bar display typically change System Data rather than flight plan data, and are used to perform system-type functions. It is possible to modify FDE data from the Status Bar controls; however, FDE data is normally changed by FDE controls in the splitter panels.

The Workstation application's menus 402 provide access to the dialogs. These, in turn, provide views into the managed data and supported operations. The Workstation application has two menus:

An extended 'Configuration Mode Menu' 406

A 'Normal Mode Menu', in which only the menu item "Help" is visible 402.

Figure 22:
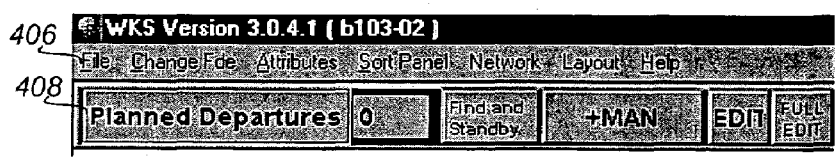
FIG. 22 illustrates a main frame in Configuration Mode with menu items of interest are Change FDE, Attribute Table, Sort Panel, Network, and Layout.

As illustrated in FIG. 22, in Configuration Mode 406, menu items of interest are Change FDE, Attribute Table, Sort Panel, Network, and Layout. These menu items are used by the DSC when configuring and testing resources and layouts. Each of these menu items displays dialog boxes.

Figure 23:
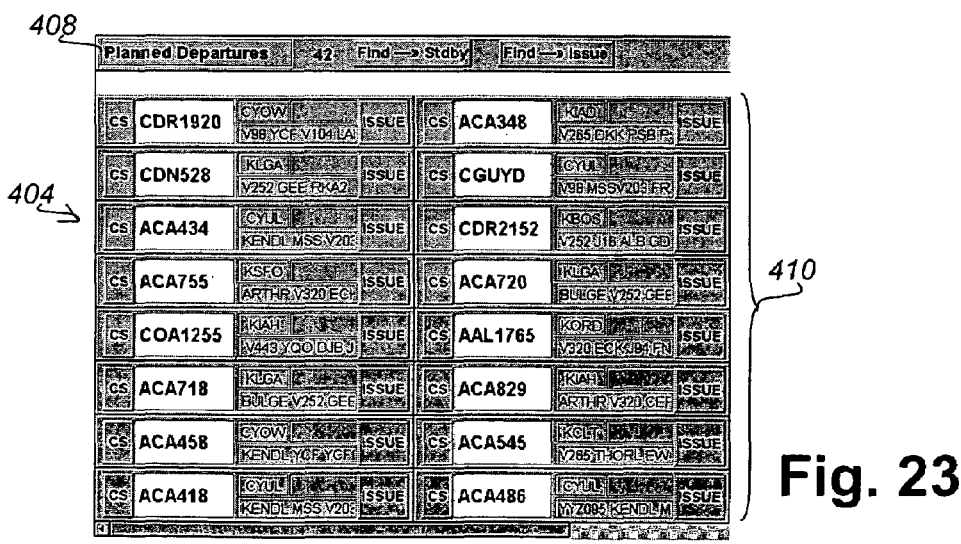
FIG. 23 illustrates the main frame divided into panels.

The Main Frame 400 is divided into "splitter panels" 404, normally referred to as panels as shown in FIG. 23, each panel 404 contains a header 408, scroll bars as required, and FDEs 410, (displayed flight data) which are sorted on specific fields to meet certain criteria.

FDEs are displayed in different panels, to signify the progress of this flight through the system. For example, all planned departures would appear in one panel, and all cleared departures would appear in another. Many panels can appear on one screen, with each panel having its own sort criteria, and therefore displaying a different list of flight plans. Usually an FDE for any flight would appear in only one panel on a workstation at a time. However, different workstations can display the same FDE at the same time.

Each panel has defined parameters which govern the type of header to be displayed, the type of FDE to display, and the sort order of the FDEs in that panel.

Figure 24:
FIG. 24 illustrates a sample header panel for a planned departure heading.

Referring to FIG. 24, there is illustrated a sample header panel for a planned departure heading. The Panel Header 408 typically:

Displays the name of its Panel 412 and, in this way, serves to identify the panel to the controller.

Displays a count 414 of the FDEs contained in its Panel.

A Panel Header can include additional controls, which the Controller can use to invoke EXCDS popups or functions.

A sample Panel Header for Planned Departures Header is shown in FIG. 24, which:

Shows the panel name 412—Planned Departures

Shows an FDE count 414 of 43

Provides for the invocation of two functions: 'Find->Stdby' 416 and 'Find->Issue' 418.

'Find->Stdby' 416 allows the controller the opportunity to select an FDE and then have this FDE sent to the Standby Panel.

'Find->Issue' 418 permits the invocation of the Clearance Issue pop-up.

Figure 25:
FIG. 25 illustrates another sample panel header, an info header, which contains four controls.

FIG. 25 shows a different sample panel header, an info header 420, which contains four controls:

EDIT 422 allows the user to edit flight plan data for a selected FDE

NEW 424 allows the user to enter a new FDE

DEL 426 allows the user to delete a selected FDE

HIDE 428 allows the user to remove an FDE from this panel.

A Status Bar:

Contains definable status elements for the position, and various controls that allow the display of data. These controls can cause additional actions to occur when the control is selected.

Is usually set up to include the name of the position that is now active.

Can appear at the bottom or top of the Main Frame.

Examples of information typically found in a Status Bar include time, special-use control buttons, weather data like wind direction and speed, and active runway.

Figure 26:
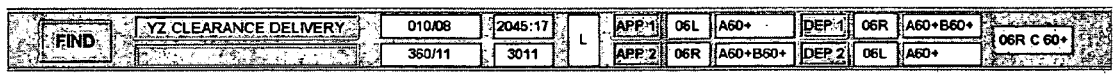
FIG. 26 illustrates an example of a Status Bar.

Referring to FIG. 26 there is shown an example of a Status Bar having the following properties:

Is located at the bottom of the Main Frame

Has a Find function which, when selected, displays a pop-up containing a list of FDEs and controls which allow a selected FDE to be sent to specified panel Displays ADAPS and RVR data associated with a runway.

Note that airport information in the Status Bar is "blanked out" if the System Data is not updated for a period of time, as specified by the VSP System Data Refresh Interval.

The Flight Data Entry (FDE) is the electronic strip. The appearance of the FDE, and the data that is displayed on the FDE, are fully adaptable by the DSC. The DM 54 maintains each FDE in the flight plan database. Only one FDE is maintained in the system for each flight plan.

An FDE is distributed over the network to only those workstations that require it. The Position Layout file and the Resources Definition file help to determine the manner in which an FDE is displayed, as well as its location.

Figure 27:
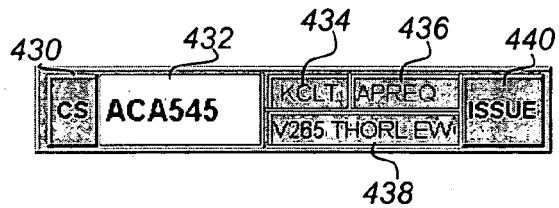
FIG. 27 illustrates a sample FDE—Planned Departures Panel FDE.

A sample FDE—Planned Departures Panel FDE, having the data required by the controller for the Planned Departures sector is shown in FIG. 27. Each element of the FDE is called a 'control'. A control can display data from a specific FDE (a database field) and can be used to perform additional actions, such as calling a pop up or a function, and changing the display's colours. The FDE of FIG. 25 contains six controls:

CS 430 is the Cock Strip control that allows an electronic equivalent of cocking a strip ACA545 is the ACID and the strip selection control 432

KCLT is the Destination Airport 434

APREQ is the Tower remarks field 436

V265 . . . is the Route 438

ISSUE is the control 440 used to invoke the Clearance Issue pop up.

Figure 28:
FIG. 28 illustrates another example of an FDE.

In FIG. 28, another example of an FDE is shown. This FDE is from the Standby Panel. Notice that it takes up less room than the Planned Departures FDE and that less data is visible.

Note: The DSC determines the control's location on the FDE, its displayed colour, and which of the possible seventy-four data items are to be displayed. This process of defining FDE and control properties is part of EXCDS adaptation.

Popups:

Provide additional information, or provide for the entry of additional information Are invoked upon selection of specific controls that are built to "call" the pop up Are used whenever a selection or action is desired that requires the use of more than one control.

The DSC builds Popups, and any number can be provided as required.

Figure 29:
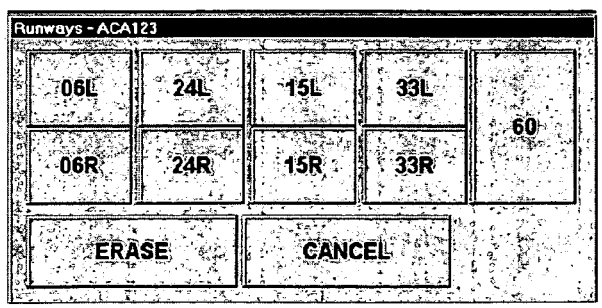
FIG. 29 illustrates a pop up is shown that allows the controller to select the desired runway.

In FIG. 29, a pop up is shown that allows the controller to select the desired runway. It can be invoked by selecting the Runway control from the Clearance Issue and Information pop up, or from the Runway control on an FDE. Shown in FIG. 29 is a sample pop up for runway selection.

Figure 30:
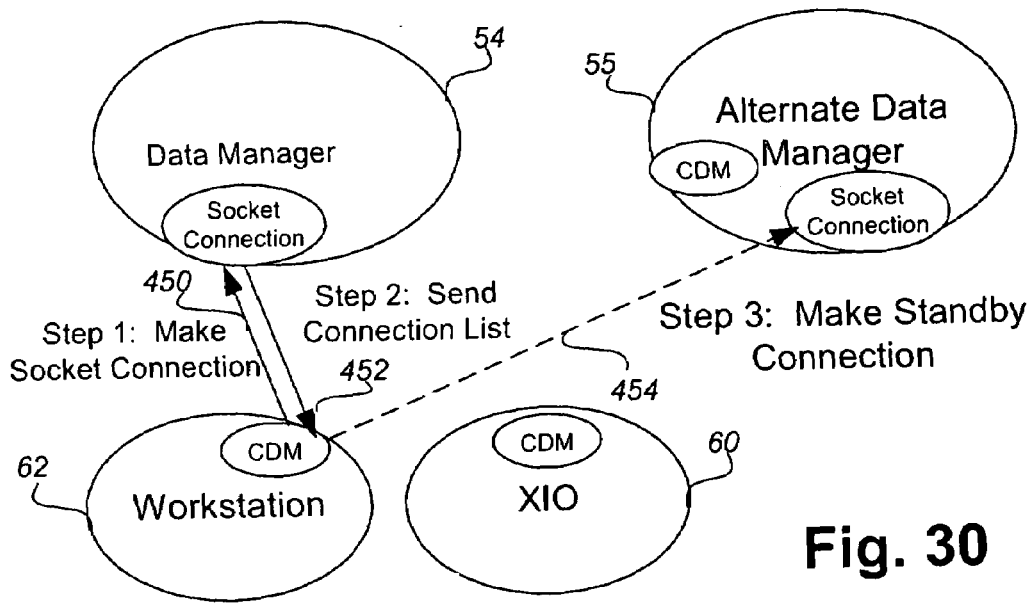
FIG. 30 illustrates in a functional block diagram, the steps taken in making a connection at startup.

Referring to FIG. 30, there is illustrated in a functional block diagram, the steps taken in making a connection at startup. When an EXCDS application starts up, it attempts to locate and connect to the Primary DM 54. To enable this, the application keeps track of the address of the last DM it successfully connected to, as well as a static list of DMs configured in the registry when the application is installed. The application first tries to connect to the last DM 54 it was last connected to. If this DM 54 cannot be found, the application tries each DM address configured in the static list, for example alternate DM 55. If a Data Manager cannot be found, the subsequent behavior is controlled by the SuppressDMListDlg registry entry.

If SuppressDMListDlg is set to 1, the application tries the static list continuously until a DM is found. If SuppressDMListDlg is set to 0, the Resolve Primary Data Manager dialog is displayed to allow the user to select the DM desired as Primary, select this DM to be Primary, or to terminate the application.

Once the DM is started as an Alternate 55, the DM list dialog might appear, if all known DMs have failed, and it is not suppressed. In this situation, the user must enter a DM name (not necessarily the Primary DM), and the client end automatically finds the Primary DM and establishes a new connection list.

When EXCDS is installed, the installation program transfers key startup data from an '.ini' file to the NT Registry.

On starting up, each EXCDS application attempts to connect to the Primary DM 54. Identification of the Primary DM is done in one of three ways:

The socket address stored in the NT Registry

The DM sends a new connection list

The User is prompted to enter the socket address to the Primary DM.

Upon startup, each EXCDS application checks these Registry entries to find the socket addresses of the Primary 54 and Alternate DM 55. Once obtained, each EXCDS application attempts to contact the Primary DM 54 via the DM's Listening Socket in the following sequence:

Contact Primary. If unsuccessful, then

Contact Alternate. If unsuccessful, then

Display dialog box waiting for user input to identify Primary DM 54.

If an EXCDS application attempts to connect to the Alternate DM 55 but as its Primary DM, the Alternate DM forwards the application to the current Primary DM.

If the connection attempt is successful 450, the Primary DM 54 includes this EXCDS application in its Client Socket Connections list. The Primary DM 54 then sends the EXCDS application a copy of the Client Socket Connection List 452. This list identifies the current Primary 54 and Alternate 55 DMs. The EXCDS application uses this data to then establish a 'standby' socket connection with the Alternate DM 454.

Figure 31:
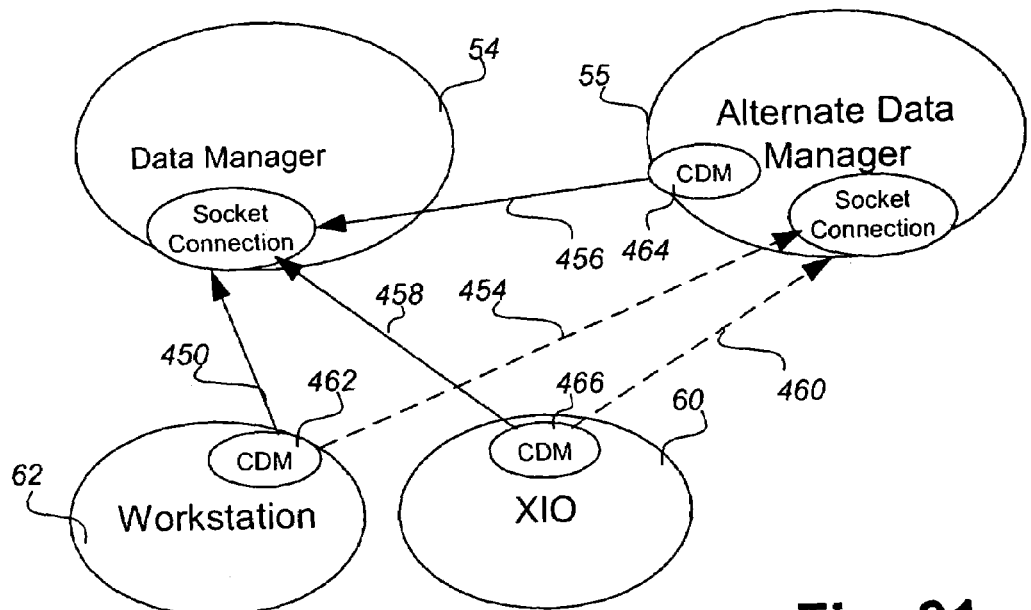
FIG. 31 illustrates completed connections.

Referring to FIG. 31, there is illustrated completed connections. Once all of the connections are made, each EXCDS application:

has a valid socket connection 450 with the Primary DM 54 has a local copy of the Client Socket Connection List has a standby connection 454 with the Alternate DM 55 is ready for receiving the appropriate subscriptions.

To monitor the progress of the connection process of FIG. 30, the name of the target DM the EXCDS application is displayed on the top of the screen, along with the EXCDS version number, as shown in FIG. 32.

The display of FDE data can be enhanced through the use of colour and blinking. The process consists of two steps:

Setting a colour or blink rate on/off

Specifying the actual colour used.

Set FDE Attributes in order to display a control in its default colour. These attributes are set via controls/Magic Bits. The actual colour to be displayed is set at the panel level of the local workstation. Once an attribute has been set, the same attribute can be represented by a different colour at different panels.

The Workstation application's Status Bar is typically configured to show the name of its position's layout running at that position—for example, North Arrival, or PDC Clearance. Controls can also be adapted to show the workstation's connection status with the Data Manager.

The EXCDS application connection sequence is represented by four steps, which are displayed in the Status Bar Position Name 470 area as a background colour, and shows in FIG. 33.

The background colour of the Position Name is coded and as shown in FIG. 34 as:
Red—not connected
Yellow—established socket connection
Blue—receipt of connection list
Green—receipt of complete subscription.
Further detail is given in Table N.

TABLE N

Colour Indications for DM Connection Status

| | |
|---|---|
| RED background | The Workstation is not connected with a DM. The Workstation displays RED while it continuously tries to connect with a DM. In this state, the Workstation application is effectively unresponsive to controller input. |
| YELLOW background | The Workstation has established a connection with a DM. The Workstation displays YELLOW while it requests a Client Connection List from the DM and until it has sent its subscription list to the Primary DM. |
| BLUE background | The Workstation has received its Client Connection List and has sent its subscriptions to the Primary DM. |
| GREEN background | The Workstation has received its subscribed data from the Primary DM. The Workstation maintains this connection as active. |

The Event Viewer can be used to see if an EXCDS application started up correctly. If the start-up is normal, three messages can be found in the Application Event Log. For example:
EXCDS information: WKS: FdeControl.ocx registered
EXCDS information: WKS: 3.0.4.1 started on ows5
EXCDS information: WKS: CClientDataManager:SynchronizeConnectionList( ) sent new data manager list: ncti_atc_svr_b.

On start-up of an ACC DM, if the Primary DM is already online, then the FDE list is sent to the starting DM as a normal part of its subscription. If there is no Primary DM 54 online, then the starting DM connects to the SQL server and attempts to get the FDE list there. If there is no SQL server, then the DM starts up with an empty FDE list.

All new information received by the Primary DM 54, or data modifications it makes, are stored in its in-memory database as well as in the EXCDS SQL Server 60 database.

Error handling includes error logging, failover, exception trapping, and socket error recovery. Error messages for certain software events are built into the code. When these events occur, error messages are sent to the Event Log.

Referring to FIG. 31 for the failover description, failover provides a mechanism whereby a failed Primary DM 54 is automatically and seamlessly replaced by another machine (an Alternate DM 55), which then becomes the new Primary DM. In the event of the Primary DM's failure, the Alternate DM assumes the duties of Primary DM.

To ensure minimal disruption in the event of a switchover, the Alternate DM 55 synchronizes its lists. It has subscriptions to all the lists maintained by the Primary DM 54. The Alternate DM 55 also keeps socket connections with each of the clients connected with the Primary DM 54, and a connection with the SQL Server. In the event of Primary DM 54 failure, the Alternate DM 55 uses these connections to tell the clients that it is now the Primary DM.

If the Client Data Manager (CDM) 462 loses contact with the DM 54, then the CDM 462 talks to the next Alternate DM 55 on the Connect List. If the CDM 462 is unable to resolve which DM to talk to, a dialog box is presented to the operator. The operator has to resolve the issue manually, unless the dialog has been suppressed by a registry entry, in which case the CDM tries continually. However, there is a performance penalty when the CDM repeatedly tries and fails to connect.

When a socket error occurs, the socket connection is terminated automatically. When the Workstation detects a loss of communication, it automatically attempts to reconnect.

The DM 54 controls which FDEs appear at a panel by publishing the required FDE data to a specific panel according to that panel's subscription. The details of a panel's subscription are entered with a layout. It is through the subscription mechanism that FDEs are made to move from one panel to another. The subscription mechanism allows the DM to index the FDE database on some of the FDE data items, and to publish FDEs to the various panels based on the data defined in the subscription. The following list in Table O shows some of the more common FDE data items that can be defined in a subscription:

TABLE O

Common FDE Data Items in a Subscription

| FDE Data Item | Description |
|---|---|
| State | Similar to NFDPS State - defines the progress of the FDE through the system |
| Magic Bits | An extension to state - allows refinements to the state definition |
| Rules | Specifies IFR or VFR |
| Runway | Specifies Departure Runway |
| Departure | Specifies point of departure |
| Destination | Specifies destination |

Alternate DMs subscribe to all of the Primary DM's lists.
All Clients subscribe to the Client Connection List.
Workstations subscribe to the System Data List and FDE List with various different filters depending on the chosen Layout.
XIO also subscribes to the FDE and System Data List with a filter set to exclude Inactive FDEs.

For example, in order for FDEs to appear in a "Toronto Clearance Delivery" panel, that panel subscribes to receive FDEs that match the following subscription:
State=PL
Departure=CYYZ.

In the above example, the DM publishes all FDEs that have a Planned State and are departing CYYZ to the Clearance Delivery panel. Then all matching FDEs simply appear in that panel.

FDE data flow defines how a flight progresses through the system being displayed on the various panels. The subscription a panel makes to the DM specifies on which FDE properties the DM filters when determining FDE eligibility for that panel.

One FDE property is Flight Plan State. Flight Plan States, used in EXCDS 50, are a combination of system-defined states (hard-coded) and adaptable states. It is necessary to use these states to obtain the benefits of the built-in EXCDS functionality associated with each state. Table P lists the Flight Plan States:

TABLE P

Flight Plan States

| State | Meaning | Description |
| --- | --- | --- |
| PL | Planned | Flight is planned but has not yet received clearance |
| CL | Cleared | Flight has received clearance |
| TX | Taxi | Departure or Arrival has taxied |
| TA | Taxied Arrival | Arrival has transitioned from Airborne to Taxied Arrival |
| AB | Airborne | Departure or Arrival is airborne |
| IN | Inactive | Flight is inactive |
| DL | Deleted | Flight is deleted |
| CN | Cancelled | Flight is cancelled |
| AR | Archived | Flight is archived -does not appear in DM FDE list |

Magic Bits are an FDE property. Magic Bits are site-configurable, and can be used in conjunction with other FDE properties to fine tune FDE distribution, for example, Flight Plan State.

For example, a site can be configured to distribute FDEs to a Tower Ground position when the state changes to Cleared. If, however, two Tower ground positions are in use, such as North Ground and South Ground, then Magic Bits can be used to ensure the FDE is distributed to the desired tower position. Table Q provides an example of this use of magic bits.

TABLE Q

Sample Magic Bit Usage

| State | Magic Bits | Destination |
| --- | --- | --- |
| CL | NG | North Ground |
| CL | SG | South Ground |

A clearance delivery position issues the clearance to the aircraft, and, upon completion; manually updates the FDE to pass it to the next position. The operator then selects an appropriate 'control' (push the right button), and both the state and Magic Bits would be 'automatically' updated. The state is updated to Cleared and the Magic Bits are updated to NG or SG, depending on the control selected. These updates are sent to the DM 54 as a change request. The DM 54 then updates the appropriate FDE object, and redistributes the updated FDE object to the subscribed panels/computers. For this to occur a DSC would have configured a panel at the North Ground position to subscribe to FDEs that have a state of Cleared and Magic Bits equal to NG.

Figure 35:
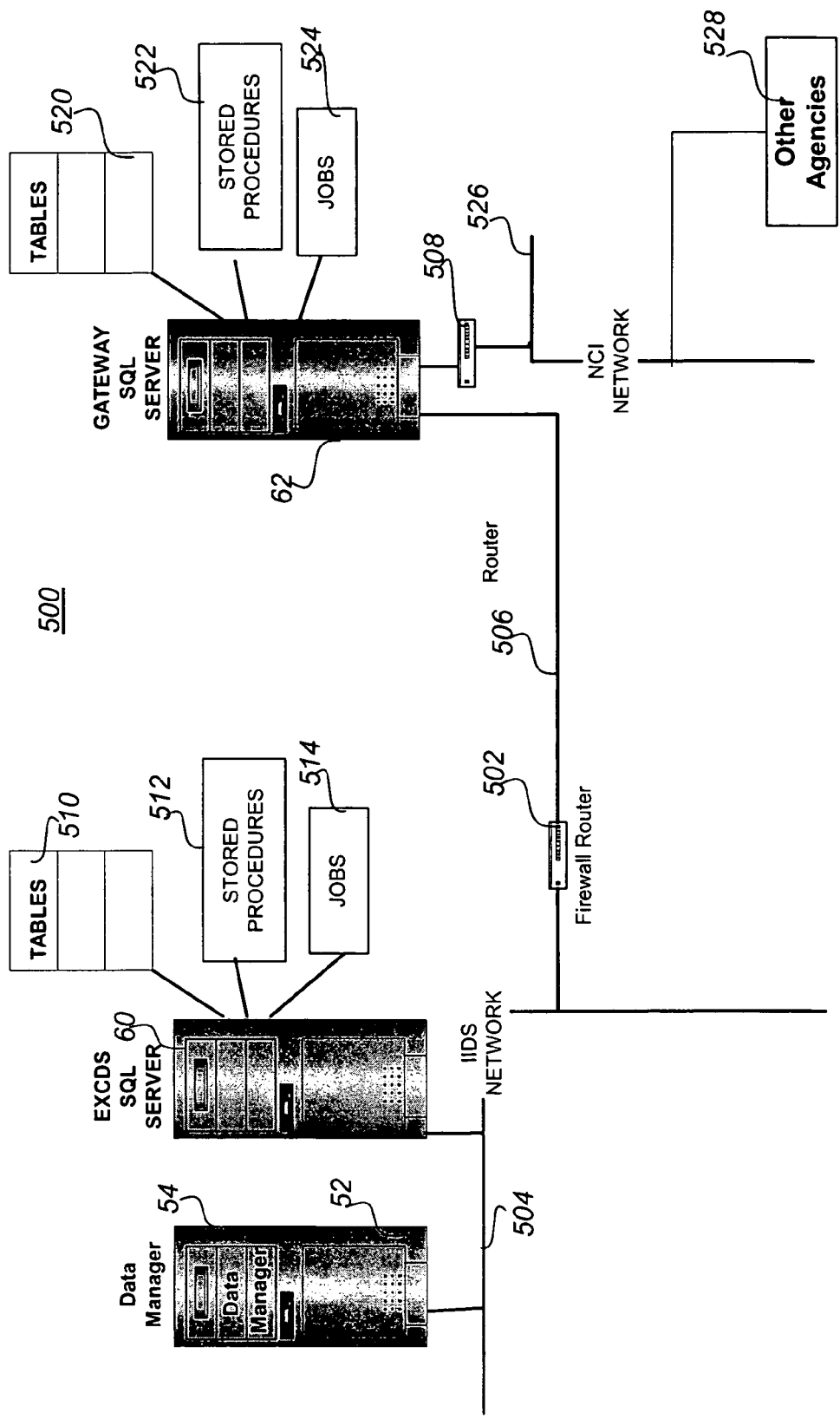
FIG. 35 illustrates the database subsystem of the EXCDS system of FIG. 3.

Referring to FIG. 35, there is illustrated the database subsystem of the EXCDS system. The database subsystem 500 includes the EXCDS SQL Server (XSS) 60 and the Gateway SQL Server 62. A router 502 configured as a firewall is located between the IIDS LAN 504 and the NavCanada Intranet (NCI) 506. The Gateway SQL Server 62 is configured with dual network interface cards (NICs). The EXCDS SQL Server 60 does not subscribe to the DM 54, but uses ODBC to establish a connection with the DM 54 and to receive all of the FDE transactions.

The EXCDS SQL Server 60:
  Maintains two database tables 510: the FDE Table, and the FDE Transaction Table.
  Receives the FDE transactions and saves them in the FDE Transaction Table.
  Uses the transactions to keep its copy of the FDE Table up-to-date.
  Maintains a transaction log that records everything that happens to an FDE, and logs certain system events.
  Receives all FDE transactions in order to record changes and archive the data.
  Stores approximately 5 megabytes of data per day.

The DM 54 writes all data modifications to an EXCDS SQL Server 60 as they occur. If a new piece of operational data is created, the DM 54 inserts it into the appropriate table. If changes are made to existing data as determined by the DM 54, an update to an existing row is made. The DM 54 does not delete rows. A SQL Server 60 scheduled task (called a Job in SQL Server) 514 periodically cleans out stale rows depending upon the last time that the data row was accessed. DM 54 uses an Open Database Connectivity (ODBC) connection to SQL Server 60 to accomplish these writes. If EXCDS SQL Server 60 is not responding, the DM 54 records the data temporarily on its hard disk until EXCDS SQL Server 60 becomes available. DM 54 then transfers this temporary data to EXCDS SQL Server 60.

Note: ODBC differs from the Publish/Subscribe method used between DM 54 and its clients, in that all transactions made by DM 54 are immediately sent to SQL Server 60, without any subscription considerations.

In order to make EXCDS data available to the unit and to outside users without impacting EXCDS operation, a connection to the local ACC's Administrative LAN 506 is necessary. This is accomplished through the use of a firewall router 502 and another SQL server called the Gateway SQL Server 62.

Gateway SQL server 62 receives regular updates from the EXCDS SQL server 60. These updates are accomplished using Stored Procedures 512 invoked from Jobs 514. The 'Transfer and movements Job' runs every 10 minutes, 23 hours per day. The Transfer and movements Job is suspended for one hour during a quiet period, while the server executes maintenance and deletes stale records jobs.

The SQL Server database 60 record provides the only operational activity log in the system, as there are no paper strips in the EXCDS environment in Tower or Terminal. This transaction record can be used for a number of purposes, such as:
  Post-performance analysis and troubleshooting (EXCDS3 also has a playback capability)
  Statistics record keeping
  Flight billing
  The SQL Server database provides the final point of recovery if both the Primary and Alternate DMs fail simultaneously.

Protection is required to prevent unauthorized access to the IIDS LAN 504 from the NCI 524, as well as unauthorized access to the NCI 524 from the IIDS LAN 504. To achieve that, the IIDS Firewall router 504 is set up with an access control list that allows only specific machines on either side to talk to each other. In fact, only SQL Server 60 and the IECS machine (for NCAMS) (not shown) on the IIDS LAN can talk to the IIDS Gateway machine 62 on the other side of the Firewall router and vice versa.

The IIDS Gateway machine 62 is installed with Microsoft SQL Server and is set up to pull data from the EXCDS SQL Server 60 every 10 minutes. An EXCDS Reporting Tool (XRT2) then queries this data that is local to the Gateway SQL Server 62. XRT2 formats the data as required.

Figure 36:
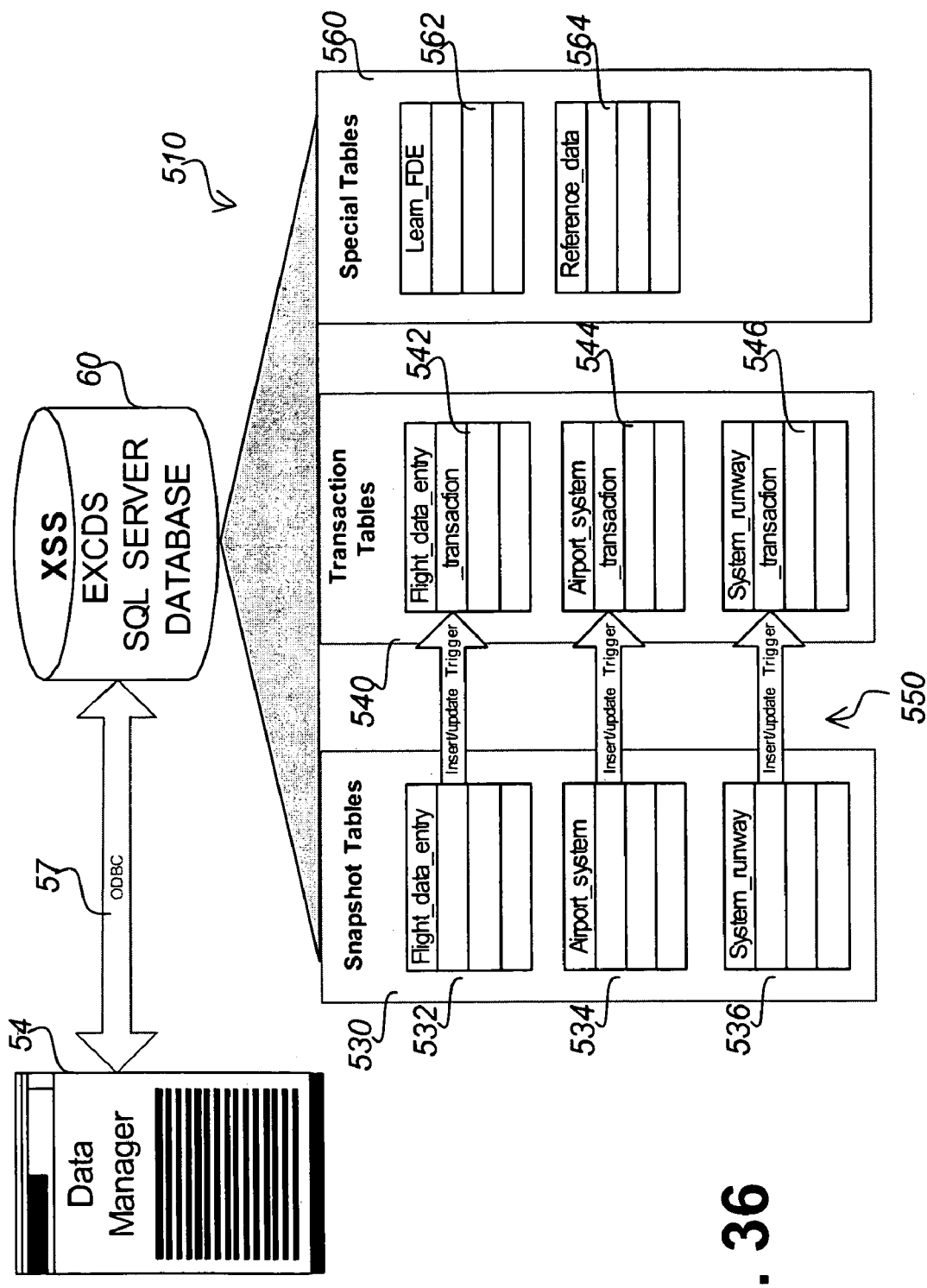
FIG. 36 illustrates how EXCDS data is stored in SQL Server Tables.

EXCDS data is stored in SQL Server Tables 510 that can be separated into 3 categories: Snapshot, Transaction and Special Purpose, as shown in FIG. 36.

Snapshot tables 530 are used to record the instantaneous state of any FDE or System Data item. Any data updates in the DM 54 are sent immediately to the "snapshot" tables 530 via their ODBC connection 528. The three "snapshot" tables are:

Flight_Data_Entry Table 532

The Flight_data_entry (FDE) table 532 holds FDE data that is directly associated with particular flight plans. An example is Aircraft Identification or ACID.

Airport_System Table 534

The Airport_system (AS) table 534 holds System Data directly associated with an unique airport. An example of this type of data is wind speed and/or direction, tower release status, and local movement counts.

System_Runway Table 536

The System_runway (SR) table 536 holds System Data associated with a unique runway at an airport. This table's data is the runway visual range (RVR) readings and lighting information received from the OIDS2 interface.

There are three transaction tables 540 populated respectively with update/insert triggers 550 that are attached to a corresponding one of the 3 "snapshot" tables 530. Any added rows, or changes occurring to existing rows in the "snapshot" tables 530, are recorded in time ordered sequence in the transaction tables 540. In this way, a complete time-stamped history for each flight and System Data item is kept in the SQL Server database 60, and can be accessed at any time.

The three transaction tables are:

Flight_Data_Entry_Transaction Table 542

The Flight_data_entry_transaction table 542 holds Flight Data Entry (FDE) transaction data. Each new entry (row) in this table generates a unique, sequential number in a column called FDE_ID. The FDE_ID column uniquely identifies each transaction. The FDE Transaction Table has the same columns as the Flight_Data_Entry Table 532 plus the FDE_ID field.

This table contains all of the transactions that have occurred to each FDE in the system. The FDE Transaction table 542 allows us to trace what has happened to any FDE. Typically, the search results would be sorted by time and workstation name, so that a chronological sequence of events could be seen for a particular workstation.

TABLE R

Elements of the Flight_Data_Entry and Flight_Data_Entry_Transaction Tables

| FDE Table and FDE Transaction | Type | Size |
|---|---|---|
| FDE_ID (Transaction Table Only) | Integer | |
| ACID | Varchar | 7 |
| ACKNOWLEDGED | Char | 1 |
| ACTUAL_TIME_OF_ARRIVAL | Datetime | 8 |
| ACTUAL_TIME_OF_DEPARTURE | Datetime | 8 |
| ADJUSTED_DEPARTURE_FLOW_TIME | Datetime | 8 |
| ADVISE_CUSTOMS | Varchar | 7 |
| AIRCRAFT_TYPE | Varchar | 10 |
| AIR_TO_GROUND_DATA_LINK | Char | 1 |
| APPROVAL_REQUEST_TIME | Datetime | 8 |
| ARRIVAL_RUNWAY | Varchar | 4 |
| ARRIVAL_SEQUENCE | Datetime | 8 |
| ASSIGNED_ALTITUDE | Varchar | 11 |
| ATIS | Varchar | 2 |
| ATTRIBUTES | Varchar | 128 |
| BLINK_UNTIL | Datetime | 8 |
| CFI | Varchar | 20 |
| CFI_REVISION | Varchar | 20 |
| CJS | Varchar | 10 |
| CLEARANCE_LIMIT | Varchar | 10 |
| COCKED_STRIP | Char | 150 |
| DEPARTURE_AIRPORT | Varchar | 4 |
| DEPARTURE_RUNWAY | Varchar | 4 |
| DEPARTURE_SEQUENCE | Datetime | 8 |
| DESTINATION_AIRPORT | Varchar | 4 |
| DISPLAYED_ROUTE | Varchar | 152 |
| EMERGENCY | Char | 1 |
| EQUIPMENT | Char | 1 |
| ESTIMATED_TIME_ENROUTE | Varchar | 5 |
| ESTIMATED_TIME_OF_ARRIVAL | Datetime | 8 |
| ESTIMATED_TIME_OF_DEPARTURE | Datetime | 8 |
| FIX_FIELD_ROUTING | Varchar | 234 |
| FLIGHT_CATEGORY | Char | 2 |
| FLIGHT_PLANNED | Char | 1 |
| FLIGHT_PLANNED_ALTITUDE | Varchar | 11 |
| FLIGHT_PLANNED_SPEED | Varchar | 5 |
| FLIGHT_RULES | Char | 1 |
| FLOW_ASSIGNED_METER_FIX_TIME | datetime | 8 |
| FLOW_ASSIGNED_RUNWAY | varchar | 4 |
| FLOW_ASSIGNED_RUNWAY_TIME | datetime | 8 |
| FLOW_ESTIMATED_METER_FIX_TIME | datetime | 8 |
| FLOW_ESTIMATED_RUNWAY_TIME | datetime | 8 |
| FLOW_MODIFIER | char | 1 |
| FREQUENCY | varchar | 10 |
| GATE | varchar | 4 |
| GROUND_ROUTE | varchar | 152 |
| HEADING_DIRECTION | varchar | 4 |
| INTERSECTION | varchar | 4 |
| LANDING_CLEARANCE | char | 1 |
| LANGUAGE_OF_COMMUNICATION | char | 1 |
| LAST_STATE_CHANGE_TIME | datetime | 8 |
| LAST_UPDATE_MACHINE | varchar | 45 |
| LAST_UPDATE_TIME | datetime | 8 |
| LOCATION | varchar | 20 |
| MAGIC_BITS | varchar | 128 |
| MEDEVAC | char | 1 |
| MISSED_APPROACH | char | 1 |
| NFDPS_CFI | varchar | 5 |
| NUMBER_OF_AIRCRAFT | varchar | 10 |
| OVERFLIGHT | char | 1 |
| REMARKS | varchar | 80 |
| RID | varchar | 12 |
| ROUTE | varchar | 152 |
| SELECTIVE_CALLING_CODE | varchar | 4 |
| SID | varchar | 10 |
| SOULS_ON_BOARD | varchar | 4 |
| SPECIAL_FUNCTION_INDICATOR | varchar | 5 |
| STAR | varchar | 20 |
| STATE | varchar | 3 |
| STATISTICS_REFERENCE_CODE | char | 2 |
| STATUS_TYPE | varchar | 10 |
| TES_FIX_TIME | datetime | 8 |
| TES_RUNWAY_TIME | datetime | 8 |
| TOUCH_AND_GO | char | 1 |
| TOWER_RELEASED | char | 1 |
| TOWER_REMARKS | varchar | 80 |
| TRAINING | char | 1 |
| TRANSPONDER_CODE | varchar | 4 |
| VALIDATION_STATUS | char | 1 |
| VNAP | varchar | 10 |
| WAKE | char | 1 |
| WEIGHT | char | 1 |
| MIO_RESPONSE | varchar | 150 |

System_Runway_Transaction Table 544

The System_runway_transaction table 544 holds system transaction data associated with a unique runway. The System_runway_ID column is an identity column, so that a new value is generated each time an insertion occurs, and each transaction can be identified uniquely.

Airport_System_Transaction Table 546

The Airport_system_transaction table 546 holds system transaction data. The System_ID column is an identity column, so that a new value is generated each time an insertion occurs, and each transaction can be identified uniquely.

The EXCDS SQL Server also includes special purpose tables 560 used for other data. There are two special purpose tables:
  Learn_FDE 562
  Reference_data 564.

Learn_FDE Table 562

The Learn_FDE table 562 holds FDE data and is used to support the EXCDS Learned FDE function. Requests from users govern the data with which it is populated, as well as the data that can be read from it.

Reference_Data Table 564

The Reference_data table 564 is provided for future usage. It is intended to store miscellaneous data.

Figure 37:
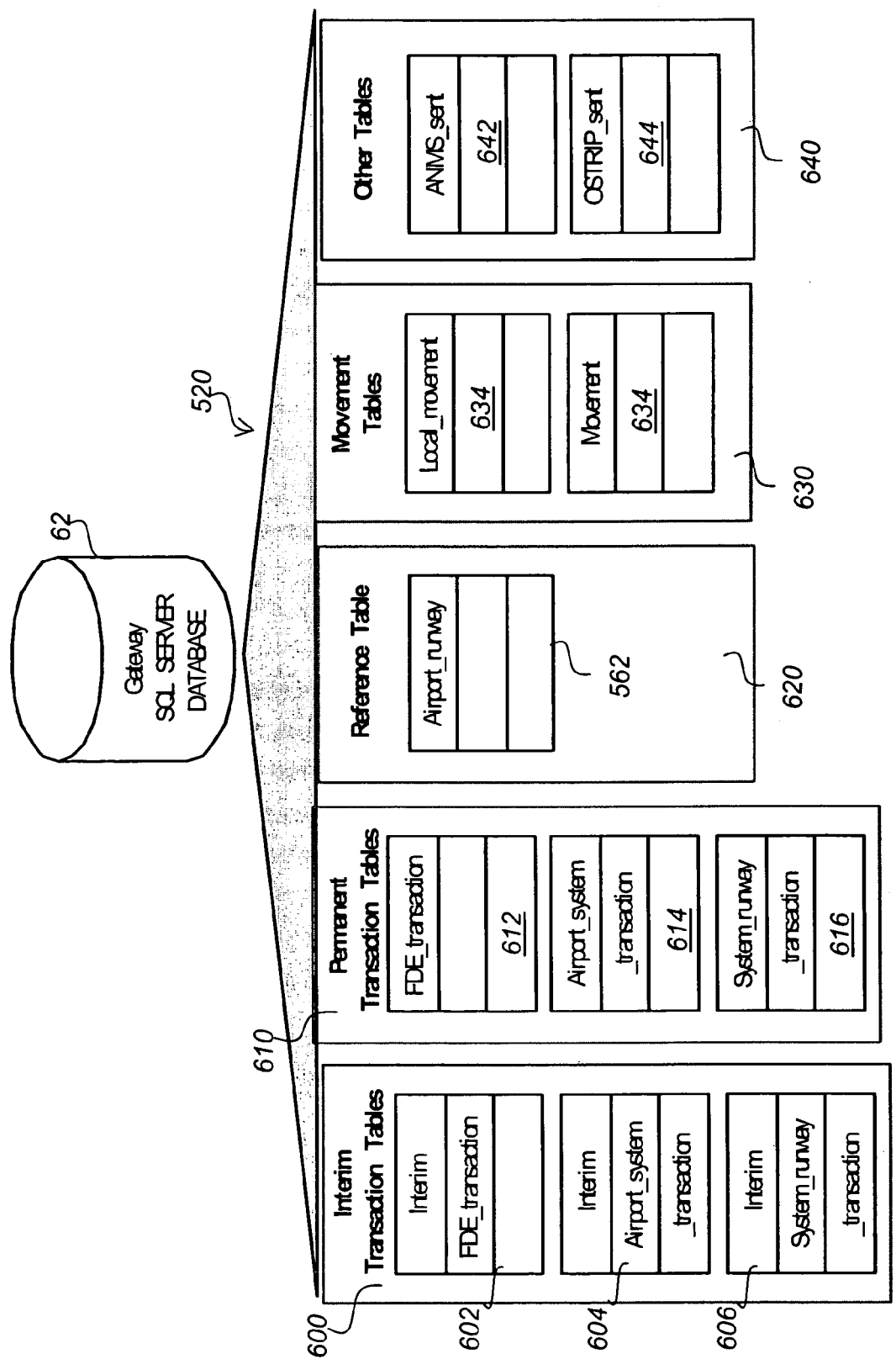
FIG. 37 illustrates that the Gateway SQL Server includes eleven tables.

Gateway SQL Server includes eleven tables, as shown in FIG. 37, configured to hold:
  Temporary (interim) transaction data 600
  Permanent transaction data 610
  Reference data 620
  Movement data 630
  Other tables 640.

The DSC typically inspects, and selects data from, the Gateway SQL Server 62. This preserves the EXCDS SQL Server's 60 resources, so that they are used primarily in support of the DM 54 and Gateway SQL Server 62.

The transaction tables 600 and 610 and resident on the Gateway SQL Server 62 are identical to those on the EXCDS SQL Server 60 within the VSP update time (current operational setting is 10 minutes). The data is pulled from the EXCDS SQL Server 60 to the Gateway SQL Server 62, less the stale data timeout differences between the servers. This means that the data accessed from the Gateway SQL Server can be up to 10 minutes old.

There are three interim transaction tables 600 that receive the associated data from the EXCDS SQL Server 60 via a scheduled job:
  Interim_fde_transaction table 602
  Interim_system_runway_transaction table 604; and
  Interim_airport_system_transaction table 606.

The interim transaction tables 600 are identical in structure to the permanent transaction tables 540, and are used as temporary placeholders for the data as it is transferred from the EXCDS SQL Server 60 to the Gateway SQL Server 62.

They are involved in moving and temporarily storing the FDE and System Data, while processing it at the same time and are cleared before each data transfer from the EXCDS SQL Server 60.

The Interim_fde_transaction table 602 temporary holds FDE transaction data as transferred from EXCDS SQL Server 60 to Gateway SQL Server 62 via a scheduled task that runs every 10 (VSP) minutes.

The Interim_airport_system_transaction table 604 temporary holds airport system transaction data as transferred from EXCDS SQL Server 60 to Gateway SQL Server 62 via a scheduled task that runs every 10 (VSP) minutes.

The Interim_system_runway_transaction table 606 temporary holds system runway transaction data as transferred from EXCDS SQL Server 60 to Gateway SQL Server 62 via a scheduled task that runs every 10 (VSP) minutes.

There are three permanent transaction tables 610 to receive the associated data from the EXCDS SQL Server 60 via a scheduled Job:
  FDE_transaction table 612
  System_runway_transaction table 614
  Airport_system_transaction table 616.

The permanent transaction tables 600 hold the permanent FDE and system transaction data that is moved across from the EXCDS SQL Server 60. They mirror the function of the transaction tables 540 in the EXCDS SQL Server 60. One use for these tables is to reconstruct events for later investigative or statistical analysis. Within the update window, these tables hold the same data as on the EXCDS SQL Server 60.

The FDE_transaction table 612 holds permanent Flight Data Entry transaction data. It records what changed, who changed it, and when it was changed. It is identical to the Flight_data_entry_transaction table 542 on the EXCDS SQL Server 60, within the update time constraints.

The FDE_transaction table 612 on the Gateway SQL Server 62 contains all transactions for all FDEs in EXCDS 50. There is no direct connection between DM 54 and the Gateway SQL Server 62. Accordingly, the risk of impact to EXCDS is reduced when data is extracted from the Gateway SQL Server 62. This makes it the ideal candidate for data extraction activities that the DSC may be called upon to perform. To that end, a number of pre-compiled data extraction queries (Stored Procedures) have been prepared for the use of the DSC. These are included in all releases of EXCDS software.

The Airport_system_transaction table 614 holds permanent airport system transaction data such as changes in designated runways, changes in weather data, and local movement data.

The System_runway_transaction table 616 holds permanent system runway transaction data such as changes in RVR readings for designated runways.

The Reference data table 620 has only 1 table in this category and it is used during the processing stage.

The Airport_runway table 622 contains a listing of all runways at all adapted airports. The airport runway table 622 is used to reference runways during the processing of aircraft movements at adapted airports. This occurs at a "transfer and synthesize" step as an automated task.

The airport runway table includes only 2 columns that associate the airport and the runway.

The Movement Data Tables 630 hold a record of both local movements and movements for all adapted airports.

The Local_movement table 632 includes entries detailing what local movements occurred, at what airport, at what time. The data is synthesized from the airport system transactions. They are categorized in accordance with standard NCAMS local movements and are associated with the adaptable Veeder Root Counter functionality.

The Movement table 634 includes of aircraft movements that have been extracted from the FDE transaction data. They are structured for extraction by an NCAMS program such as XRT2.

Other tables 640 includes for example ANMS sent 642 for airport noise monitoring system feed application as a cache table to mark the latest FDE sent to the ANMS client and OSTRIP sent 644 used by the XRT2 application as a cache table to mark the base. FDE sent to the OSTRIP file.

Figure 38:
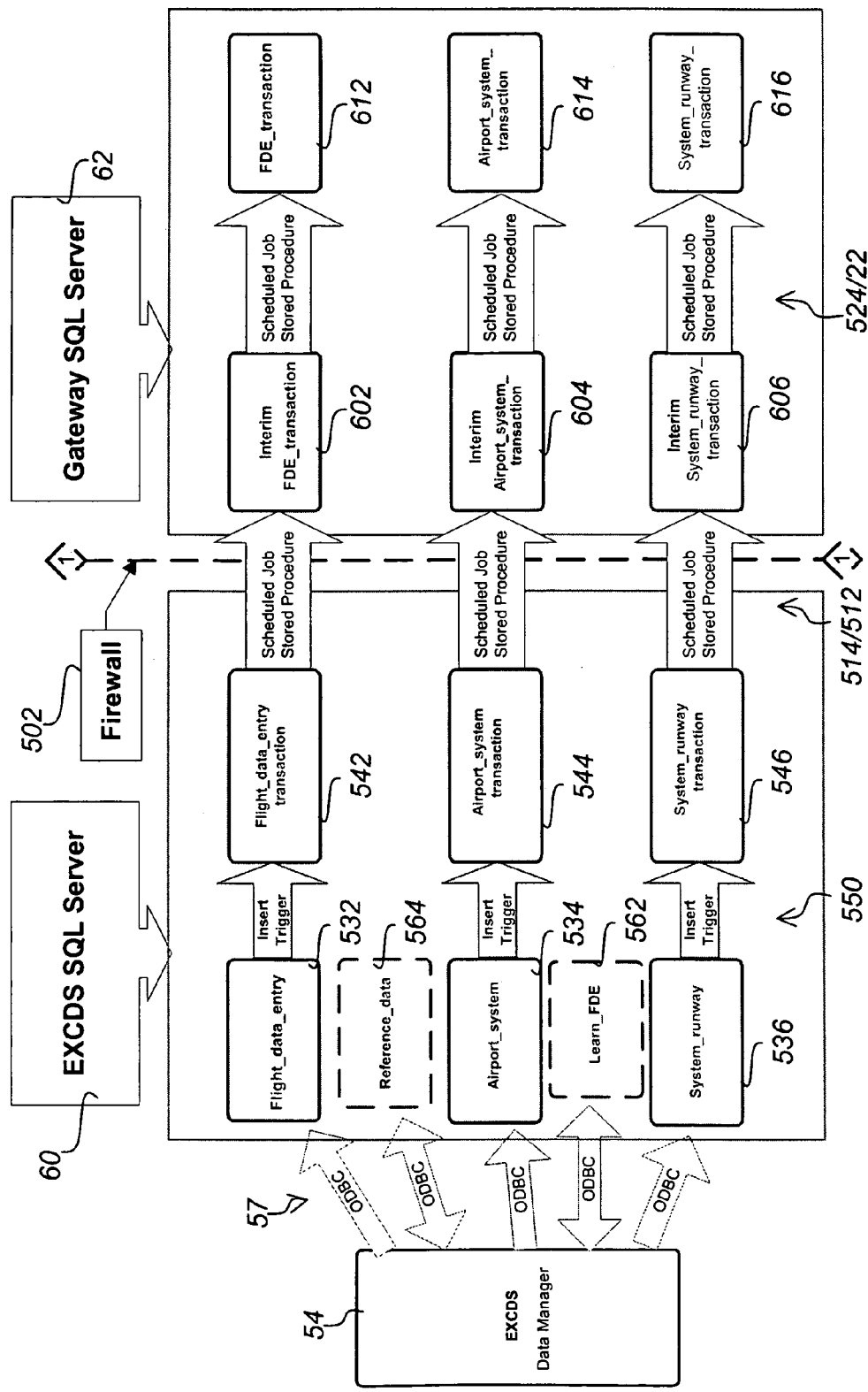
FIG. 38 illustrates in a functional block diagram, data movement between the data manager the EXCDS SQL Server and the Gateway SQL Server.

Referring to FIG. 38, there is illustrated in a functional block diagram, data movement between the data manager the EXCDS SQL Server and the Gateway SQL Server.

Jobs 514 are recurring tasks that SQL Server 60 can be programmed to perform. All Jobs 514 used in the EXCDS SQL Server 60 are included with releases of EXCDS software, so the DSC is not expected to build or configure Jobs. Maintaining jobs is the responsibility of Maintenance technicians. However, if the DSC receives a report that the movements table is not being updated, he can inspect Jobs, and report any failures to Maintenance.

Jobs 514 can use Stored Procedures 512 to carry out their tasks and each Job can include multiple steps. Placing Steps in a Job ensures that time sequence is enforced—i.e., one Step in a Job does not commence until the preceding one is finished.

EXCDS SQL Server 60 has Jobs 524 for:
  Stale data removal
  Database maintenance.

Gateway SQL Server has Jobs for:
  Stale data removal
  Database maintenance
  A task that transfers operational data from the EXCDS SQL Server 60 to itself.

When EXCDS is used for control and coordination, it collects data that is used to create local and itinerant movement records. Movement records are derived from actions performed by controllers, eliminating the need for NCAMS data entry. The actual processing of movement data is done outside of the operational EXCDS system on the Gateway SQL server 62.

For each airport reporting local movements, the last local movement counter values for each hour are recorded in the local_movement table 632.

An itinerant movement is recorded in the movement table 634, for transactions that meet the following criteria:
  ACID is not null or empty
  Valid ATD and departure runway for departure airport (departure movement)
  Valid ATA and arrival runway for destination airport (arrival movement).

For arrival and departure (non-88) movements, at most one arrival and one departure per CFI is recorded. When multiple transactions qualify as movements, the latest (highest fde_id) transaction is used; any previous movement transactions for that CFI are deleted.

Multiple overflight (88) movements are recorded for a CFI providing the ATD/ATA are different by at least 1 minute. This allows the use of the same CFI for multiple overflight operations (traffic reporters, etc.).

The airport_runway table 622 in the EXCDS database on the gateway SQL server 62 must contain all required runway codes (including 60, 70, and 99; 88 is built-in) for the airport(s) that are using EXCDS for movement reporting. A typical set is supplied when EXCDS is installed, and may be inspected and adjusted using SQL commands or stored procedures (see dsc_help).

Controls that transition arrival and departure FDEs between taxied and airborne states, and overflights through control zones, must set the ATD or ATA fields in order for a movement to be recorded.

Controls that indicate multiple arrival and departure movements (overshoot, touch and go, stop and go) must create a new CFI by copying the selected FDE.

Tower procedures must assign the correct movement code (valid runway or 60/70/88/99) for all operations that require a movement record, and must use the appropriate controls to transition FDEs as discussed under Controls.

Local movements are recorded at adapted operational positions using controls that provide counters for single engine, multi engine, jet and military movement categories. The operational software maintains a copy of the local movement counters for each airport in the airport_system table, and resets these counters to zero at the end of each hour. When a row is added or updated, a trigger copies the row to the airport_system_transaction table.

Periodically airport_system_transaction rows are copied from the EXCDS operational SQL database 60 to the gateway SQL database 62. The new rows are scanned for movement data, as discussed under Business Rules. The actual processing is done by a stored procedure (sp_transfer_local) that is run as part of a job under the control of the SQL Agent.

The EXCDS SQL database 60 maintains a copy of each FDE in the flight_data_entry table 532. When a FDE row is added or updated, a trigger 550 copies the row to the fde_transaction table 542.

Periodically FDE transaction rows are copied from the EXCDS operational SQL database 60 to the gateway SQL database 62. The new rows are scanned for movement data, as discussed under Business Rules. The actual processing is done by a stored procedure 522 (sp_transfer_synthesize) that is run as part of a job under the control of the SQL Agent.

EXCDS movement processing is designed to provide timely movement data, typically adapted at a resolution of 10 minutes. This precludes ignoring potential movement transactions until an end state (archived) transaction is detected, because this could cause a delay of several hours from the time a movement occurs until it is recorded.

The EXCDS operational software does not distinguish movements from other activities, and the system is typically adapted to meet operational rather than administrative requirements. As a result there may be multiple transactions representing potential movements from which actual movements are synthesized. An example is when an operational position issues take-off clearance and selects the "depart" control on an FDE, thus recording a departure movement, but subsequently recalls the FDE from the airborne state (due to a rejected take-off, clearance cancelled, etc.). The movement, which was recorded, has not actually occurred, and is thus removed from the system. A movement is recorded when the "depart" control is selected again.

The technique employed is to identify and record the latest available movement information for each flight during each processing period, and update or delete previous movement records as new transactions are received.

Numerous modifications, variations and adaptations may be made to the particular embodiments of the present invention described above without departing from the scope of the invention as defined in the claims.

What is claimed is:

1. An air traffic information display system comprising:
  a data manager placed at the middle tier of a three-tier architecture, the data manager for arbitrating flight, system and airport data transactions in a performance-related manner, the data manager including a first interface and a plurality of second interfaces;
  a first database server forming one tier of the three-tier architecture and being connected to the data manager via the first interface; and
  a plurality of clients forming the other tier of the three-tier architecture and being capable of coupling to the data manager via the plurality of second interfaces, at least one client being different from the other client, and the second interfaces being common to the plurality of clients; and a gateway server coupled to the database server through a firewall, the gateway server for moving data from a secure domain to a less secure domain in a non-intrusive manner, the data manager including module for providing, based on a subscription list for the plurality of clients, data updates in a secure and apportioned manner in accordance thereto.

2. A system as claimed in claim 1 wherein the data manager is a primary data manager and further including an alternate data manager capable of coupling to the primary data manager via one of the plurality of second interfaces, the alternate data manager automatically and seamlessly taking over the operation of the primary data manager and becoming the primary data manager.

3. A system as claimed in claim 1 wherein one of the plurality of clients is an external input/output server.

4. A system as claimed in claim 1 wherein at least one of the plurality of clients is a workstation having a display screen includes a dedicated touch screen and a Graphical User Interface that is fully adaptable to user requirements.

5. A system as claimed in claim 1 wherein each of the plurality of second interfaces includes a server data manager and a client data manager designed such that the second interfaces are common to the clients which wish to have dynamic real-time read-write access to the flight data, system data and airport data.

6. A system as claimed in claim 1 wherein the data manager maintains, passes and receives lists of data including flight data entries, system information and dynamically updated connection lists, as a streamed object via a streamed socket connection.

7. A system as claimed in claim 1 wherein the first database server includes first tables for current data and second tables for logging changes to current data.

8. A system as claimed in claim 7 wherein the first tables include a flight data table.

9. A system as claimed in claim 7 wherein the first tables include an airport system table.

10. A system as claimed in claim 7 wherein the first tables include a system table.

11. A system as claimed in claim 7 wherein the second tables include a flight data table.

12. A system as claimed in claim 7 wherein the second tables include an airport system table.

13. A system as claimed in claim 7 wherein the second tables include a system table.

14. A system as claimed in claim 1 wherein the first interface is ODBC.

15. A system as claimed in claim 7 wherein the gateway server includes a gateway database server having third tables for receiving updates from the second tables that are stored on a remote machine across a secure firewall; processing these updates to extract aircraft movements, local aircraft movements and flight transactions; and logging copies of the third tables into fourth tables.

16. A system as claimed in claim 15 wherein the gateway database server includes fifth tables for storing movements.

17. A system as claimed in claim 16 wherein the gateway database server includes a module for calculating movements in dependence upon changes in the third tables.

18. A method of transmitting and displaying air traffic information using a data manager placed at the middle tier of a three-tier architecture where a database server forming one tier of the three-tier architecture and a plurality of clients forming the other tier of the three-tier architecture, comprising the steps of:

maintaining, passing, receiving or combinations thereof an active and dynamic list of subscribers as a streamed object via a socket connection to add or delete the subscriber, the subscriber being a client and interested in updated data;

receiving and parsing a data update request from the subscriber to determine where the updated data is to be delivered, and what subset of the updated data is to be sent;

changing data object in accordance with the data update request;

ensuring that the data is updated in the database server and in local caches as processing time permits for enhanced reliability;

transmitting, by an active push mode, the updated data or the subset of the updated data only to the client which is a subscriber and is interested in that data.

generating an error and a logging of the error if it fails to receive acknowledgement of a receipt of the updated data from a client.

19. A method as claimed in claim 18 wherein the step of providing the changed data includes providing only the data determined by a criteria included in the list of subscribers.

20. A method as claimed in claim 18 wherein the step of storing includes storing the changed data in first tables.

21. A method as claimed in claim 18 wherein the step of storing includes storing a log of data change transactions in second tables.

22. A method as claimed in claim 20 wherein the first tables include a flight data table.

23. A method as claimed in claim 20 wherein the first tables include an airport system table.

24. A method as claimed in claim 20 wherein the first tables include a system table.

25. A method as claimed in claim 21 wherein the second tables include a flight data table.

26. A method as claimed in claim 21 wherein the second tables include an airport system table.

27. A method as claimed in claim 21 wherein the second tables include a system table.

28. A method as claimed in claim 21 wherein the step of storing includes storing updates from the second tables in third tables.

29. A method as claimed in claim 28 wherein the step of storing includes logging copies of the third tables in fourth tables.

30. A method as claimed in claim 28 wherein the step of storing includes calculating movements in dependence upon changes in the third tables.

31. A method as claimed in claim 30 wherein the step of storing includes storing movements in fifth tables.

32. A database system for moving and storing data outside of a secure operational domain, a gateway server for moving data from a secure domain to a less secure domain in a non-intrusive manner; and a firewall placed between the gateway server and the secure operational domain, the gateway server including:

data storage module;

module for transferring operational data from the secure operational domain;
the firewall configured to allow only specific machines to communicate with the gateway server through the firewall; and
the firewall further configured to allow only the gateway server to communicate with specific machines through the firewall.

* * * * *